US008898479B2

(12) United States Patent
Shaw

(10) Patent No.: US 8,898,479 B2
(45) Date of Patent: Nov. 25, 2014

(54) INTEGRATED GENOMIC AND PROTEOMIC SECURITY PROTOCOL

(75) Inventor: Harry C. Shaw, Bel Air, MD (US)

(73) Assignee: The United States of America as represented by the Administrator of the National Aeronautics Space Administration, Washington, DC (US)

( * ) Notice: Subject to any disclaimer, the term of this patent is extended or adjusted under 35 U.S.C. 154(b) by 2 days.

(21) Appl. No.: 13/534,442

(22) Filed: Jun. 27, 2012

(65) Prior Publication Data

US 2013/0046994 A1     Feb. 21, 2013

Related U.S. Application Data

(63) Continuation-in-part of application No. 13/211,432, filed on Aug. 17, 2011.

(51) Int. Cl.
*H04L 9/32* (2006.01)
*H04L 9/08* (2006.01)

(52) U.S. Cl.
CPC ............ *H04L 9/0866* (2013.01); *H04L 9/3228* (2013.01)

USPC ......................................................... 713/189

(58) Field of Classification Search
None
See application file for complete search history.

(56) References Cited

U.S. PATENT DOCUMENTS

| | | | |
|---|---|---|---|
| 6,312,911 B1* | 11/2001 | Bancroft et al. | 435/6.11 |
| 2003/0036857 A1* | 2/2003 | Yao et al. | 702/20 |
| 2006/0212414 A1* | 9/2006 | Osborne et al. | 706/27 |
| 2007/0067833 A1* | 3/2007 | Colnot | 726/9 |
| 2009/0049551 A1* | 2/2009 | Ahn et al. | 726/23 |
| 2009/0110192 A1* | 4/2009 | Elrod et al. | 380/44 |

* cited by examiner

Primary Examiner — David Le

(57) ABSTRACT

Apparatuses, systems, computer programs and methods for implementing a genomics-based security solution are discussed herein. In an encryption process, plaintext may be converted to DNAtext and DNAtext may be converted to a ciphergene. The ciphergene may then be converted into a pre-transcriptional complex. The pre-transcriptional complex, in turn, may then be converted into a cipherprotein. The decryption process operates in the reverse of the encryption process to obtain plaintext.

1 Claim, 34 Drawing Sheets

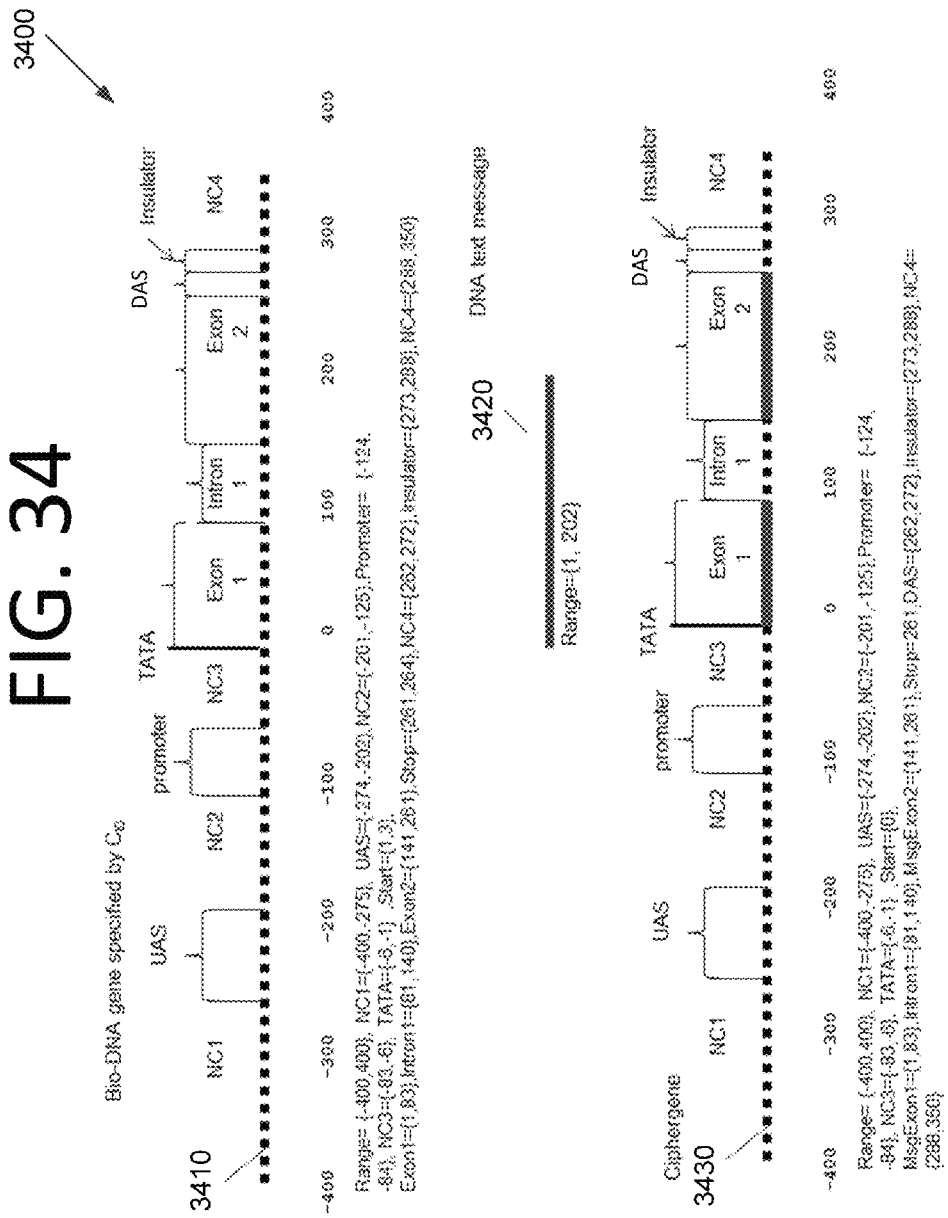

INTEGRATED GENOMIC AND PROTEOMIC SECURITY PROTOCOL

CROSS-REFERENCE TO RELATED APPLICATION

This application is a continuation-in-part of, and claims priority to, U.S. patent application Ser. No. 13/211,432, filed on Aug. 17, 2011. The subject matter of the earlier filed application is hereby incorporated by reference in its entirety.

ORIGIN OF THE INVENTION

The invention described herein was made by an employee of the United States Government and may be manufactured and used by or for the Government for Government purposes without the payment of any royalties thereon or therefore.

FIELD

The present invention generally relates to encryption, and more particularly, to a genomic and proteomic encryption protocol that utilizes message authentication codes and encryption codes derived from deoxyribonucleic acid ("DNA"), ribonucleic acid ("RNA"), proteins, nucleotides and their derivatives, and amino acids and their derivatives.

BACKGROUND

Existing security protocols and algorithms have varying degrees of vulnerability. Cryptanalysis techniques are strong and improve with increases in computing capability. Conventional encryption algorithms are well-studied and have acquired numerous attack strategies. All algebraic algorithmic approaches will eventually fall to a successful attack. Protocols for performing authentication are vulnerable to social engineering. Certificate Authorities ("CAs") are vulnerable to identity impersonation in the fixed infrastructure environment. Creating practical CAs for a mobile ad-hoc network ("MANET") infrastructure has the same vulnerability as the fixed infrastructure, with more challenges. The useful lifetime of cryptographic codes is unpredictable.

Networks are particularly vulnerable, for example, due to lax security implementation of existing protocols. An attacker using packet sniffers such as Wireshark® may be able to recover plaintext message authentication codes. Attackers can spoof unsecured network devices via protocol attacks such as spoofing a Hot Standby Router Protocol ("HSRP") router into changing the active router or via Simple Network Management Protocol ("SNMP") reconnaissance. Attackers may probe networks and retrieve legitimate access control information. Further, a misconfigured firewall can be used against the network that such a firewall is trying to protect.

DNA has also been used as a cryptographic medium. For example, some systems use DNA as a one-time code pad in a steganographic approach. The steganographic approach may be desirable because DNA provides a natural template for the hidden message approach. Such methods generally pertain to inserting encrypted sequences into genomes. However, no current technological approach exists that uses a broad range of biological pathways for information and network security devices.

SUMMARY

Certain embodiments of the present invention may provide solutions to the problems and needs in the art that have not yet been fully identified, appreciated, or solved by current encryption technologies. There is a need for additional security protocols that go beyond what currently exists. Nature provides a number of sources for novel security concepts and architectures. Molecular biology provides a rich source of gene expression and regulation mechanisms that can be adopted for use in information and network security systems. For example, some embodiments of the present invention use a combination of algorithms and the product of gene expression of actual living things, such as bacteria or plants, to create codes for authentication and confidentiality.

Such embodiments of the combination of living and algorithmic gene expression form a "ciphercolony." Ciphercolonies exist to provide the basis of codes for authentication and encryption and to provide patterns of gene expression in response to authentication and encryption requests. The contents of a ciphercolony are electronically stored in ciphercolony databases for use by the protocols. Ciphercolonies contain cipher analogs of biological colonies (ciphergenes, cipher RNA, cipherproteins, etc.).

in some embodiments, the ciphercolony and its databases reside in a physical security device called a "BioID." The BioID may be attached to computers or networks via suitable interfaces to permit the BioID to render biological and algorithmic solutions to authentication and encryption messages and commands. The BioID may contain all of the necessary elements to sustain and modify, as necessary, the biological and algorithmic contents of the ciphercolony.

The ciphercolony databases may contain instructions for encrypting and decrypting DNAtext sequences by inserting/deleting transcriptional control region codes that mimic the properties of gene control sequences such as promoters, insulators, activation sequences, etc. The ciphercolony databases may contain instructions for applying transcription factor codes and functions that identify transcriptionally active regions of a gene sequence to be used for encryption such that a single sequence can represent multiple codes. The ciphercolony databases may contain instructions for applying folding codes such that distal regions of the gene sequence are brought in close proximity without transposing sequence locations of the distal regions.

The ciphercolony databases may contain instructions for applying RNA Polymerase codes to control the encryption of the coded folded sequences containing transcription factor codes. The ciphercolony databases may contain instructions for transcribing sequence codes into messenger RNA sequence codes and/or for post-transcriptional modification (editing) of messenger RNA sequence codes. The ciphercolony databases may contain instructions for translating messenger RNA sequence codes into protein codes.

The ciphercolony databases may contain instructions for modifying (editing) protein codes with post-translational group codes including, but not limited to, Phosphorylation, Glycosylation, Ubiquitination, S-Nitrosylation, Methylation, N-acetylation, Lipidation, and Proteolysis. The BioID may accept a plaintext message and synthesize the protein corresponding to the cipherprotein sequence generated from the plaintext message. The BioID may identify one or more proteins in the live flora/fauna of the ciphercolony and generate one or more plaintext messages corresponding to the code associated with the decrypted cipherprotein sequence(s).

In an embodiment, an apparatus includes a processor and memory storing computer program instructions and a BioID. A user sends a plaintext message and a message identifier code to the BioID. The BioID retrieves a gene sequence and control regions from the ciphercolony database and codes and expands the plaintext message into DNA text with control regions. The new structure is a ciphergene. The ciphergene is returned to the user. Alternatively, the user sends a ciphergene message and message identifier code to the BioID. The BioID retrieves the reverse codes from the ciphercolony database and decodes and extracts the ciphergene to DNAtext and converts it to plaintext. The plaintext is returned to the user.

In another embodiment, a computer-implemented method is performed by a physical computing device and a ciphercolony database. The physical computing device may be a desktop or laptop computer, a server, a database, a personal digital assistant ("PDA"), a cell phone, a tablet computer, a distributed system, a cloud computing system, or any computing device or combination of computing devices, as would be understood by one of ordinary skill in the art. The computing device retrieves a gene sequence and control regions from the ciphercolony database and codes and expands the plaintext message into DNAtext with control regions. The new structure is a ciphergene. The ciphergene is returned to user. Alternatively, the user sends a ciphergene message and message identifier code to the computing device. The computing device retrieves the reverse codes from the ciphercolony database and decodes and extracts the ciphergene to DNAtext and converts it to plaintext. The plaintext is returned to the user.

In another embodiment, a computer-implemented method is performed by a physical computing device and a BioID. The computing device retrieves a gene sequence and control regions from the BioID and codes and expands the plaintext message into DNAtext with control regions. The new structure is a ciphergene. The ciphergene is returned to user. Alternatively, the user sends a ciphergene message and message identifier code to the computing device. The computing device retrieves the reverse codes from the BioID and decodes and extracts the ciphergene to DNAtext and converts it to plaintext. The plaintext is returned to the user.

In some embodiments, the apparatus may take the ciphergene code to another level of coding as cipher-mRNA codes. The apparatus may decode cipher-mRNA codes to ciphergene code. In some embodiments, the apparatus may take the cipher-mRNA code to another level of coding as cipherprotein codes. The apparatus may decode cipherprotein codes to cipher-mRNA codes.

In another embodiment the apparatus takes the cipherprotein code to another level of coding as post-translationally modified cipherprotein codes. The apparatus decodes post-translationally modified cipherproteins codes to cipherprotein codes.

In one embodiment the apparatus can receive specific messages that produce changes in the pattern of gene expression of one or more proteins in the ciphercolony in vivo. The change in the patterns of gene expression authenticates the ciphercolony identity.

In one embodiment the apparatus can incorporate new entities that genetically modify the genes of the ciphercolony or modify the patterns of gene expression without genetic modifications, to produce changes in the pattern of gene expression.

In one embodiment, a computer program is embodied on a non-transitory computer-readable medium. The computer program is configured to cause a processor to perform the algorithmic processes of a ciphercolony.

In another embodiment, a computer-implemented method performed by a physical computing device includes encoding, by a processor, DNAtext from a plaintext message using the plaintext and a cipher identifier. The computer-implemented method also includes encrypting, by the processor, the DNAtext into a ciphergene using the DNAtext and the cipher identifier.

In yet another embodiment, a computer-implemented method performed by a physical computing device includes generating, by a processor, DNAtext from a ciphergene by decrypting the ciphergene using a cipher identifier. The computer-implemented method also includes generating, by the processor, plaintext from the DNAtext by decrypting the DNAtext using the cipher identifier.

BRIEF DESCRIPTION OF THE DRAWINGS

For a proper understanding of the invention, reference should be made to the accompanying figures. These figures depict only some embodiments of the invention and are not limiting of the scope of the invention. Regarding the figures:

FIG. 34 illustrates the mapping of DNA text into the protein coding region of a Bio-DNA gene sequence yielding a ciphergene, according to an embodiment of the present invention.

DETAILED DESCRIPTION OF THE EMBODIMENTS

Figure 1:
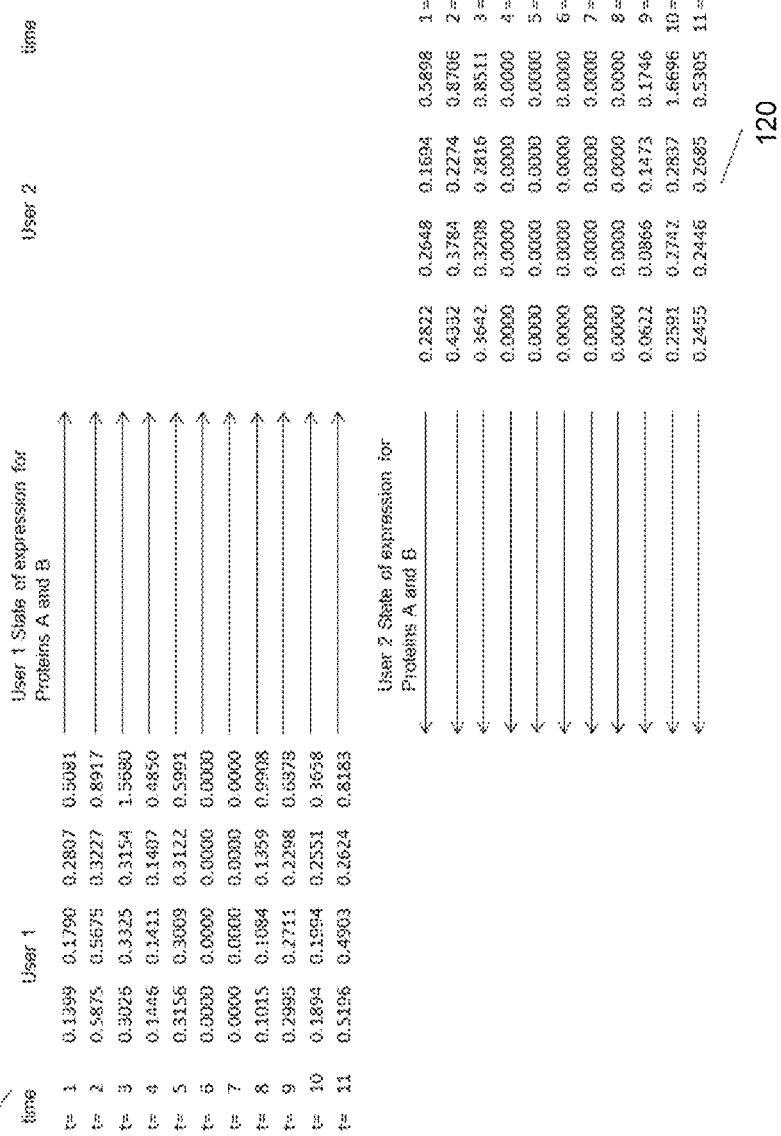
FIG. 1 illustrates two users establishing ciphercolony identity credentials based upon state vectors of the ciphercolony for future authentication usage, according to an embodiment of the present invention.

It will be readily understood that the components of the present invention, as generally described and illustrated in the figures herein, may be arranged and designed in a wide variety of different configurations. Thus, the following detailed description of the embodiments of apparatuses, systems, methods, and computer readable media, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Genomics-based authentications protocols may be used to augment traditional network security approaches. The combination of genomics-based and algebra-based (elliptic curves over finite fields, modular exponential, discrete logarithm, random oracles, etc.) ciphers creates a new paradigm of two-phase authentication, leading to more secure and attack-resistant fixed infrastructure networks, mobile networks, and mobile ad hoc networks ("MANETs"). Accordingly, some embodiments of the present invention use a combination of algorithms and the product of gene expression of actual living things, such as bacteria or plants, to create codes for authentication and confidentiality. These codes may feed into a security protocol that dictates how the patterns of gene expression are used to authenticate a member of a network. Multiple levels of encryption may be used to generate stronger security protocols. The natural complexity and variation of genes in biological organisms allows for the creation of a very strong security protocol that hackers without significant financial resources generally cannot effectively attack, and presents very strong security even to those with significant financial, biological, and computational resources, such as state actors.

As discussed above, adding conventional biological protocols to networks that do not have good security practices generally does not increase security or decrease vulnerability. However, adding biological security protocols in networks with a good security posture may enhance security by significantly raising the level of attack complexity, reducing the vulnerability of conventionally encrypted traffic and reducing the opportunities for security breaches through social engineering. Social engineering is generally understood as trickery or deception for the purpose of information gathering, fraud, or computer system access. For example, an attacker may pose as a member of an organization, enter the building, and steal a password or other access information. Proper biological security protocols also provide a secure backstop when network operations are required to continue in an environment of degraded security. The protocols may be turned on and off as necessary.

Such protocols may be particularly useful for Internet Protocol Security ("IPsec")-like and Multiprotocol Label Switching ("MPLS")-like customer bases that deploy virtual private networks ("VPNs") and use a mixture of public and private network infrastructure. Private portions of the network infrastructure may implement biological security systems to augment secure communications across the public infrastructure (e.g., the Worldwide Web ("WWW")). Biological security systems could be added to the existing infrastructure. For example, individual users at the Personal Computer ("PC") level may have secure Biological Identification ("BioID") tokens for network authentication.

Advantages and Requirements of Genomics-Based Authentication Systems

The genomics-based protocols lack many of the inherent weaknesses of conventional security approaches and may create more complex challenges for network intruders, who will now have to challenge network security on the algorithmic and biological planes. This combination of genomics-based and mathematics-based (e.g., elliptic curves over finite fields, modular exponential, discrete logarithm, and random oracles) ciphers creates a new paradigm of two-phase authentication that may lead to more secure and attack-resistant fixed infrastructure networks, mobile networks, and MANETs. Some keys to the acceptance of genomics-based authentication may include: (1) bandwidth efficient genomic authentication algorithms; (2) a low overhead genomic authentication process; and (3) the development of a genomics-based authentication tools including genomic tokens, cipher genes, and cipher proteins.

The authentication algorithm should generally be bandwidth-efficient to ensure that the channel capacity and network latency are reasonable for proper network functioning. This would generally be most critical for bandwidth-constrained 3G and broadband wireless links. The genomic authentication process should have a reasonable overhead for functionality. This means that the time to complete authentication and session establishment should be reasonable as compared with current protocols, such as Transport Layer Security ("TLS") and Secure Shell ("SSH"). Genomics-based authentication tools should have a reasonable development path using currently available microelectronic, microeletromechanical systems ("MEMS") and microbiological techniques. This also may mean demonstrating that the technology development concepts are sufficiently mature to bring these tools to market. This may be demonstrated via a technology roadmap for genomics-based authentication tools.

Patterns of Gene Expression

A pattern of gene expression is created by an organism going through the processes of DNA transcription and RNA translation. The organisms have genes that code for products that are "expressed" by transcription and translation. Genes are always expressed within the context of overall cellular requirements. Thus, genes are expressed in response to stimuli indicating a need for expression. All genes are not expressed all the time. The genome for *Escherichia coli* K-12 MG1655, for example, consists of 4,639,221 bases organized into approximately 4300 genes. Protein-coding genes account for ~87.8% of the genome, ~0.8% of the genome encodes stable RNA, and ~0.7% of the genome consists of noncoding repeats, leaving ~11% of the genome for regulatory and other functions.

*E. coli* is in the family of prokaryotes, or single-celled organisms that lack a nucleus. Even within this simple cell, only about 80% of the gene functions are fully understood. *E. coli* has complex patterns of gene expression and a number of features to regulate gene expression. Stepping up to a more complex genome in the family of eukaryotes, or single-celled organisms with a nucleus, consider the rice genome *Oryza sativa* L. ssp. *indica*. *O. sativa* is 430 Mbases (million bases) in size, with an estimated 46,022 to 55,615 genes. *O. sativa* exists as diploid (2n=24) and tetraploid (2n=48) forms. *Oryza* has ten recognized genotypes that vary widely in genome size. *Oryza* has a mitochondrial genome. Eukaryotic organisms have more complex mechanisms of regulating gene expression than prokaryotic organisms, involving a wide range of factors at the transcriptional and translational level. It is understood that any suitable genome from any organism may be used, including those from more complex multicellular eukaryotic organisms.

Each pathway of gene expression contributes to an overall pattern of gene expression. These patterns of gene expression can be represented as sets of random variables. The interaction between the patterns of gene expression by different organisms and colonies of organisms can also be represented as sets of random variables. Thus, the interactions can be modeled using probabilistic and stochastic processes. However, the fact that these processes are generally not fully understood or characterized allows nature to be used as a natural generator of cryptographic codes and protocols that are functions of patterns of gene expression. The more complex the organism, the greater the diversity of the pattern of gene expressions.

Ciphercolonies

The BioID in some embodiments of the present invention includes one or more ciphercolonies. A ciphercolony is a collection of organisms and algorithms (which may be limited to non-pathogenic prokaryotes and eukaryotes, up to the complexity of multicellular organisms such as plants and multicellular fauna and fungi in some embodiments) with a set of genes and patterns of gene expression. In some embodiments, live flora may be substituted or enhanced with gene expression from cell-free lysates. In certain embodiments, the gene sequences can be from synthetic genomes. The products of gene expression may be sampled and coded into encryption algorithms. Given a sample size of 100,000 gene expression products from a ciphercolony sampled at 10 products at a time yields $$\left\{ \begin{array}{c} 100,000 \\ 10 \end{array} \right\} = 2.7545 \times 10^{43}$$

ciphertext inputs. Some of the gene expression products may be naturally derived based upon actual assay samples from the ciphercolonies and some may be derived algorithmically. By using a combination of natural and algorithmic gene expression products, there will generally be little or no coding latency due to the time it takes to perform biochip-based assays.

By way of example, assume that a ciphercolony has two organisms, where each organism is capable of expressing four gene expression products. In this case, the four gene expression products are four proteins. The first organism has patterns of expression A represented by the random or pseudorandom variables $\{x_1, x_2, x_3, x_4\}$. The second organism has patterns of expression B represented by the random or pseudorandom variables $\{y_1, y_2, y_3, y_4\}$. These random variables represent the quantity of a gene expression product when fully expressed (i.e., the maximum amount that the organism would produce in a homogeneous culture). The union of A and B represents the complete pattern of gene expression in the ciphercolony. A and B produce the gene expression products (proteins) with probabilities as predicted in the random variables p(a) and p(b). These probabilities may change based upon the state of the expression of A and B. The patterns of gene expression may be modified by post transcriptional forms of regulation as represented by F and G. The presence of proteins from the first organism affects the levels of expression of proteins in the second organism, and vice versa, as represented by state matrix H. In mathematical terms, for this example:

$$A = \{0.5, 3.6, 7.1, 1.2\}$$

$$B = \{1.6, 2.9, 0.1, 9.7\}$$

$$P(A) = Pr\left\{(A_1, A_2, A_3, A_4) = (a_1, a_2, a_3, a_4), \sum_{i=1}^{4} a_i = 1\right\}$$

$$P(B) = Pr\left\{(B_1, B_2, B_3, B_4) = (b_1, b_2, b_3, b_4), \sum_{i=1}^{4} b_i = 1\right\}$$

$$P(C) = Pr\left\{(C_1, C_2, C_3, C_4) = (c_1, c_2, c_3, c_4), \sum_{i=1}^{4} c_i = 1\right\}$$

$$F = \begin{bmatrix} 0 & 0.2 & 0.4 & 0.4 \\ 0.2 & 0.1 & 0.6 & 0.1 \\ 0 & 0.5 & 0.5 & 0 \\ 0.3 & 0 & 0.3 & 0.4 \end{bmatrix}$$

$$G = \begin{bmatrix} 0.2 & 0.2 & 0.2 & 0.4 \\ 0 & 0.5 & 0.5 & 0 \\ 1 & 0 & 0 & 0 \\ 0.5 & 0 & 0 & 0.5 \end{bmatrix}$$

$$H = \begin{bmatrix} 0.3 & 0.2 & 0 & 0.5 \\ 0 & 0 & 0 & 1 \\ 0.1 & 0.2 & 0.5 & 0.2 \\ 0.25 & 0.25 & 0.15 & 0.35 \end{bmatrix}$$

A MATLAB simulation of 1024 rounds of gene expression was performed over 64 iterations for this example. At each iteration, random probabilities P(A) and P(B) are applied to the gene expressions A and B, followed by application of post-transcriptional expression state matrices F and G. The sum of the expressed products by A and B directly affect the expression of both, so random probabilities P(C) are applied to the sum of proteins followed by post-transcriptional expression state matrix H. The result is dynamic changes in the observed levels of expression of the eight proteins (four for the first organism and four for the second organism). These results provide a natural "random oracle" to feed the three levels of encryption and authentication protocols described in the integrated genomic and proteomic information security protocol of some embodiments of the present invention.

The output of each round of simulation is a state vector that describes the state of protein expression in the ciphercolony. The state vector is time stamped and translated into a message encrypted by any desired protocol. The state vector is retained by the originator and transmitted to the other ciphercolonies in the network. The set of all time stamped state vectors defines the state of protein expression for the history of a ciphercolony.

No two users will have an identical ciphercolony. This is because even if two users started with identical live flora, they will have divergent patterns of gene expression. Additionally, different ciphercolonies will undergo different forms of expression modifications to force the patterns of gene expression to diverge from a steady state. Furthermore, the algorithmic patterns of gene expression of each ciphercolony may be initialized with random seeds derived from a pattern of gene expression from a live colony (either within the ciphercolony or externally-derived).

Users can authenticate each other by requesting one or more time stamped state vectors, decrypting the state vector(s) and comparing the decrypted state vector(s) to a previously stored value. Gaps in the time record can also be used for authentication. If a user knows of a time window in which no state vectors were distributed, the gap in the record can be used as an authentication tool.

The state of each ciphercolony can be characterized by a Markov chain of states with transition probabilities for the state of gene expression. Stochastic tools of maximum likelihood and maximum a posteriori estimation can be used for evaluating behavior observed in the ciphercolony. The security is derived from the computational infeasibility of an attacker to produce a series of fraudulent time stamped state vectors and the infeasibility of an attacker to gain access to a large enough set of legitimate, properly ordered, time stamped state vectors (for example, through a man-in-the-middle attack) such that an acceptable fraudulent identity can be forged.

FIG. 1 shows the exchange of time stamped vectors 100 between User 1 110 and User 2 120 from a simulation, according to an embodiment of the present invention. In this example, User 1 110 and User 2 120 have ciphercolonies that express proteins A and B. For User 1 110, at time intervals 6 and 7, no expression data is given, resulting in a gap in the record. For User 2 120, there is a gap in time intervals 4 though 8.

FIG. 1 depicts the uncoded data. In a real application, the data would undergo source and channel coding and encryption. Source coding to achieve a target entropy code length could be applied for data compression or unique identification of code words longer than the minimum entropy code. Such coding will enhance error detection and correction, as well as authentication.

Figure 2:
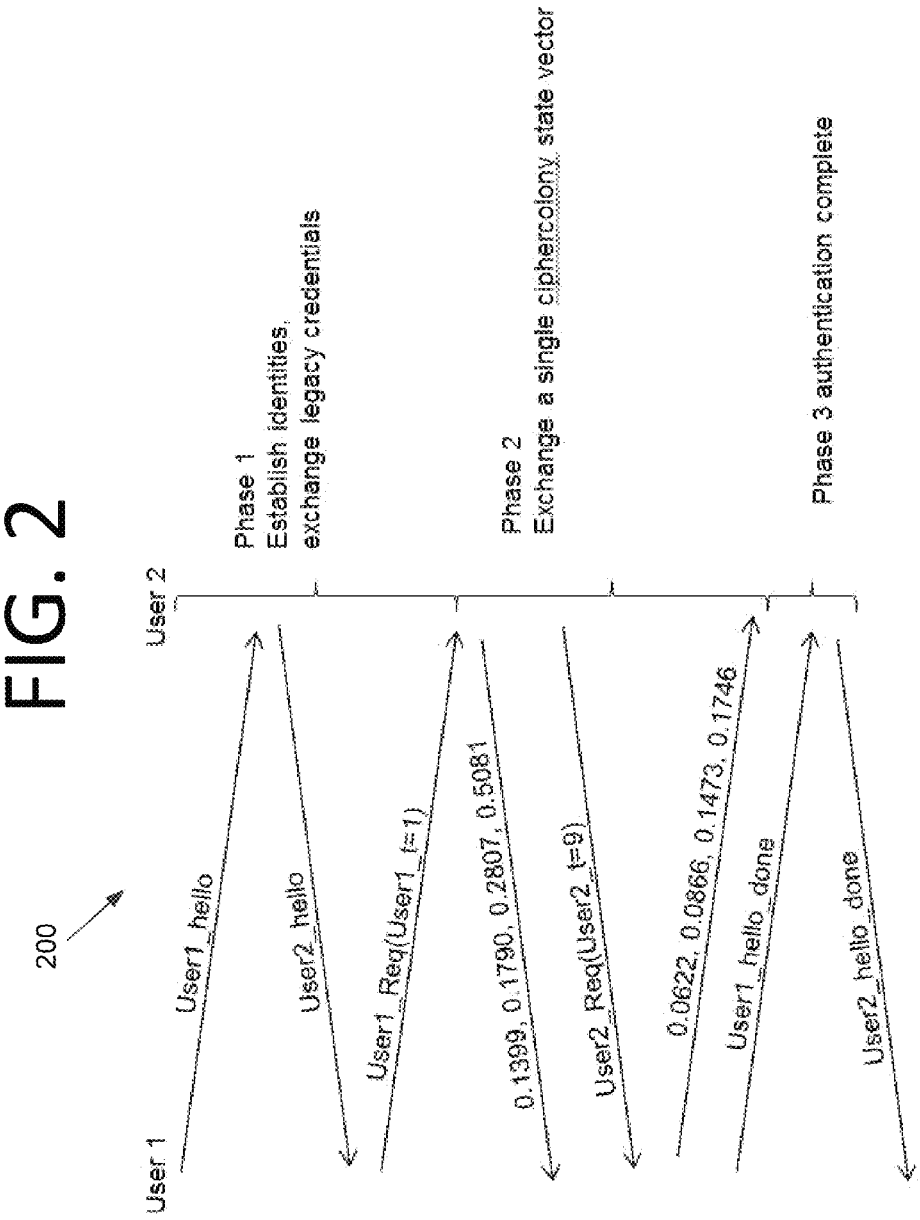
FIG. 2 illustrates authentication handshaking message flow between two users, according to an embodiment of the present invention.

FIG. 2 depicts an authentication handshaking message flow 200 between User 1 and User 2. User 1 and User 2 have previously exchanged ciphercolony state information for proteins A and B. After exchanging identities via a legacy (e.g., secure sockets layer ("SSL")) authentication process, User 1 requests that User 2 send the previously exchanged User 1 state vector for time stamp t=1. User 2 responds and requests that User 1 send the previously exchanged User 2 state vector for time stamp t=9. User 1 and User 2 complete the handshaking process. In the case of a compromised network, the ciphercolony-based system may provide a temporary means to continue network operations until the threats to the legacy systems have been neutralized. The biosecurity system can operate in parallel with legacy security protocols. Samples of the gene expression products may be used to generate inputs for network-to-network security associations. These inputs may include inputs to public/private key pairs, key encryption keys, nonces, and bio-certificates for the bio-CA.

Figure 3:
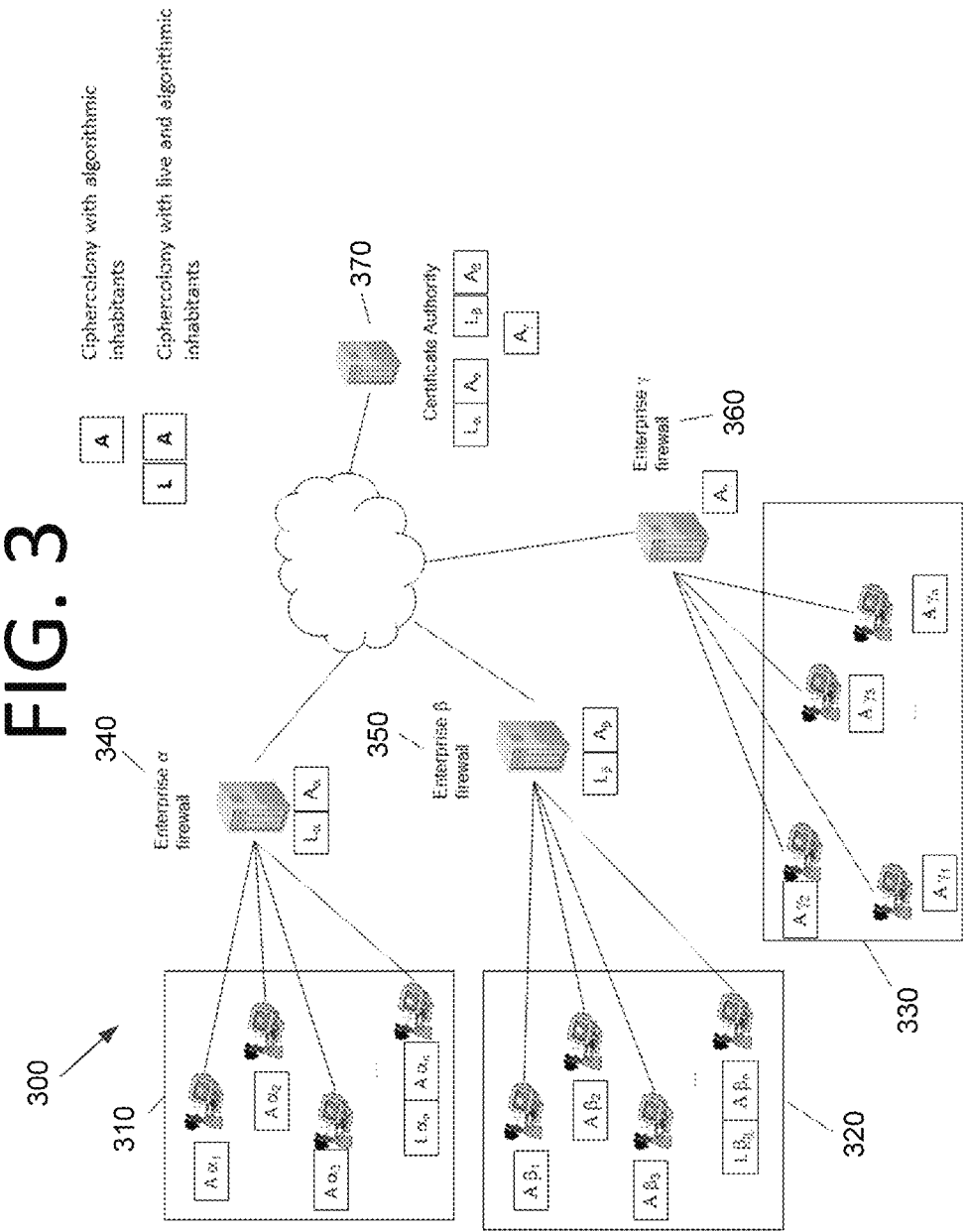
FIG. 3 illustrates an architecture with individual users possessing BioIDs communicating through firewalls, which are also equipped with BioIDs, according to an embodiment of the present invention.

FIG. 3 illustrates a hierarchy of a biosecurity architecture 300, according to an embodiment of the present invention. Large networks and certificate authorities may have large ciphercolonies. At the level of the individual user, there may be BioID tokens that contain encrypted, compressed copies of gene expression product data without any actual living organisms. Some local users may have desktop ciphercolonies to provide some local bio information technology ("IT") security. This architecture 300 is described in FIG. 3. In FIG. 3, three networks are shown: network alpha ($\alpha$) 310, network beta ($\beta$) 320, and network gamma ($\gamma$) 330. There also exists a certificate authority ("CA") 370. The users of network 310, denoted by $\alpha_1, \alpha_2, \ldots, \alpha_n$, possess BioIDs containing ciphercolonies. User $\alpha_1$ possesses a BioID containing only algorithmic inhabitants as denoted by A$\alpha_1$. User $\alpha_2$ possesses a BioID containing only algorithmic inhabitants as denoted by $A\alpha_2$, and so on. User $\alpha_n$ possesses a BioID containing both live and algorithmic inhabitants as denoted by $L\alpha_n A\alpha_n$. User $\alpha_n$ may represent a local IT security authority for $\alpha$ (the user-user interaction within the networks is not shown).

Network $\alpha$ is isolated from the Internet by a firewall 340. Firewall 340 possesses a BioID with all the credentials of the users of network $\alpha$. The users of network 320, denoted by $\beta_1$, $\beta_2$, ..., $\beta_n$, possess BioIDs containing ciphercolonies in an analogous manner to network 310. User $\beta_n$ possesses a BioID containing both live and algorithmic inhabitants as denoted by $L\beta_n A\beta_n$. User $\beta_n$ may represent a local IT security authority for $\beta$. Firewall 350 isolates network $\beta$ from the Internet and has a BioID with all of the credentials of the users of network $\beta$.

The users of network 330 possess BioIDs with only algorithmic ciphercolonies. The CA 370 possesses a BioID encompassing the union of all the keys in networks 310, 320, and 330. Firewalls 340, 350, and 360 function in their normal manner. Firewalls 340, 350, and 360 process incoming and outgoing traffic from their respective networks. Traffic requiring use of the functions of the live and algorithmic inhabitants of the ciphercolony is processed at the firewall level. CA 370 performs the certificate management functions (enrollment, revocation, change of status privileges, etc.) of networks 310, 320, and 330 using the credentials of the respective networks. The BioIDs are equipped with full functionality exchange state information of both live and algorithmic inhabitants of their ciphercolonies. The BioIDs equipped with only algorithmic inhabitants exchange state information only on those inhabitants. The state information is then available for authentication verification and challenge purposes.

Ciphercolony Key Features

In some embodiments, ciphercolonies have the following features. First, the ciphercolonies are alive. Consequently, ciphercolonies require feeding and removal of waste products. External power may be required to maintain the environment. Air, water, and light may be required. For example, imagine a very small, self-contained terrarium with plug-in modules to perform nutrient replacement and waste disposal.

Second, the ciphercolonies may achieve a steady state of gene expression without infusion of external stimuli to force the patterns of gene expression to change. Evolution provides some level of stimulus, but generally not enough for the purposes of maximizing diffusion and confusion of codes. These external stimuli may take the forms of environmental change (e.g., ambient temperature, pH, etc.), substrate change (what the organisms are fed), introduction of new organisms to the colony, transfection of vectors capable of modifying the genomes in the ciphercolonies, and transfection of vectors capable of modifying regulation pre- and post-transcriptionally, or pre- and post-translationally. Such vectors may include genetically modified viruses, bacteria, and interference RNA ("RNAi"). All functions may be modularized such that their operation is transparent to the IT security users.

Third, ciphercolonies generally require occasional replacement on some recurring schedule, such as yearly, although any period of time may be used as a matter of design choice. Fourth, the manufacturer may be required to maintain living copies of every ciphercolony during its term of service. Fifth, all of the functions of ciphercolony development, coding of patterns of gene expression, modifications of the patterns of gene expression, and detection and assay can be performed based on this disclosure, and starter ciphercolonies and codes can be stockpiled for the initial operating capability of these systems while they are being developed.

Figure 4:
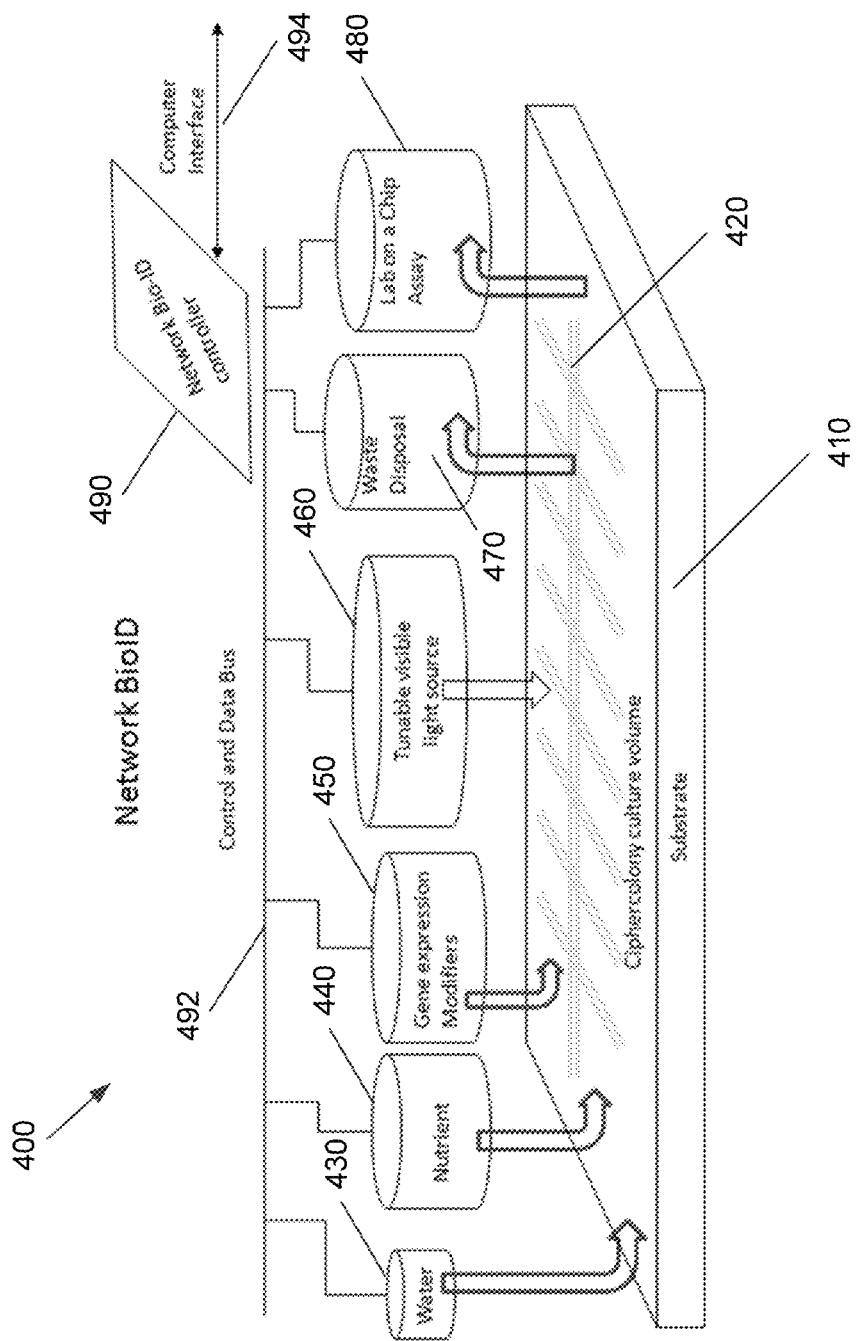
FIG. 4 illustrates a layout of a BioID incorporating a ciphercolony inhabited with live flora, according to an embodiment of the present invention.

FIG. 4 illustrates ciphercolony packaging and interfaces 400 within the network Bio-ID, according to an embodiment of the present invention. A substrate 410 supports a ciphercolony culture volume 420. System inputs such as water distributor 430, nutrient distributor 440, gene expression modifier 450, and tunable visible light sources 460 may be adjusted by network Bio-ID controller 490 via bus 492. A user interacts with network Bio-ID controller 490 via computer interface 494. A waste disposal unit 470 and a lab-on-a-chip assay 480 are controlled in a similar manner.

Multiple Levels of Security

Figure 5:
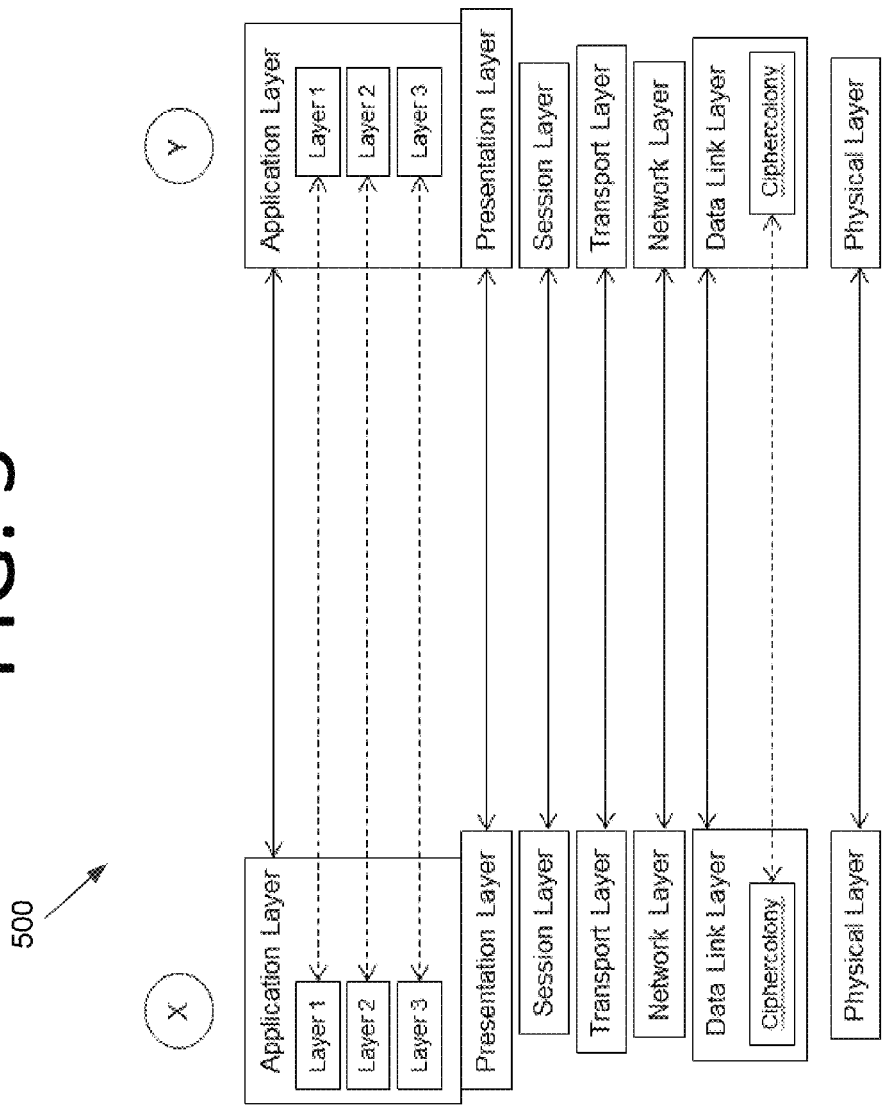
FIG. 5 illustrates an Open Systems interconnection ("OSI") reference architecture, according to an embodiment of the present invention.

Some embodiments of the present invention utilize one or multiple levels of security based on the sensitivity of information in the network. In other words, some embodiments have a modular design such that the protocol can be tailored on a user-specific basis. Such embodiments provide a security architecture that maintains a biological context such that messages in the electronic domain map directly to the biological domain. In a three-level implementation, even knowledge of the ciphergene and its products does not permit derivation of the biogene and its products, or vice versa. FIG. 5 depicts the levels of security 500 from the viewpoint of the Open Systems Interconnection (OSI) reference model protocol stack architecture as an element of the application layer, according to an embodiment of the present invention. The security protocols would typically exist at the network layer or application layer. The ciphercolony would typically appear at the data link layer.

The nature of the ciphercolony also lends itself to a composable cloud computing form of security. The ciphercolony function could be delegated to a platform as a service ("PaaS"). The union of all ciphercolonies can be expressed as a composable cloud of ciphercolonies.

Figure 6:
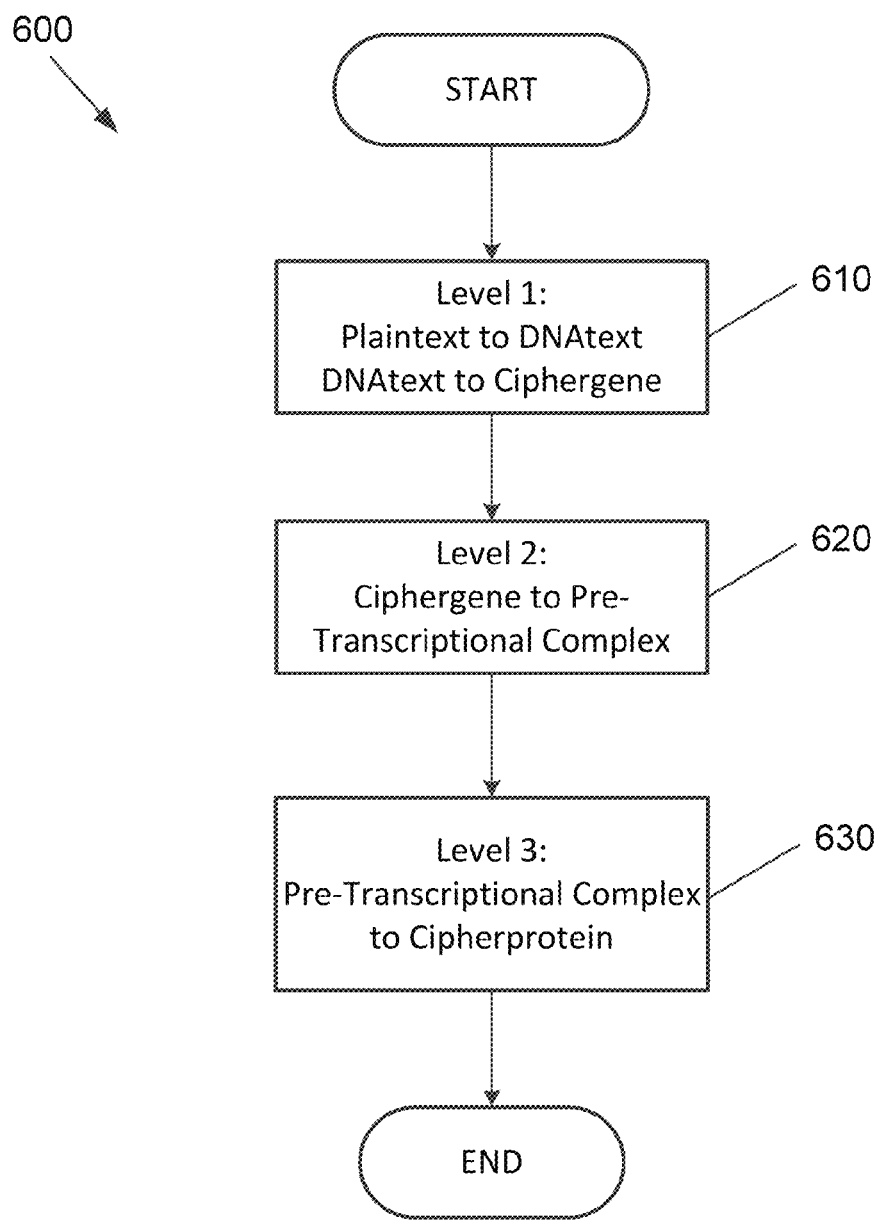
FIG. 6 is a flowchart illustrating three protocol layers, according to an embodiment of the present invention.

FIG. 6 is a flowchart 600 illustrating a method for encryption in an integrated genomic and proteomic security protocol, according to an embodiment of the present invention. The three levels of security in some embodiments of the protocol are shown in FIG. 6. In some embodiments, the method may be performed by system 1600 of FIG. 16, and the other methods described herein may also be performed by a system with at least some similar components. The decryption process operates in the reverse of the encryption process shown in FIG. 6.

Figure 7:
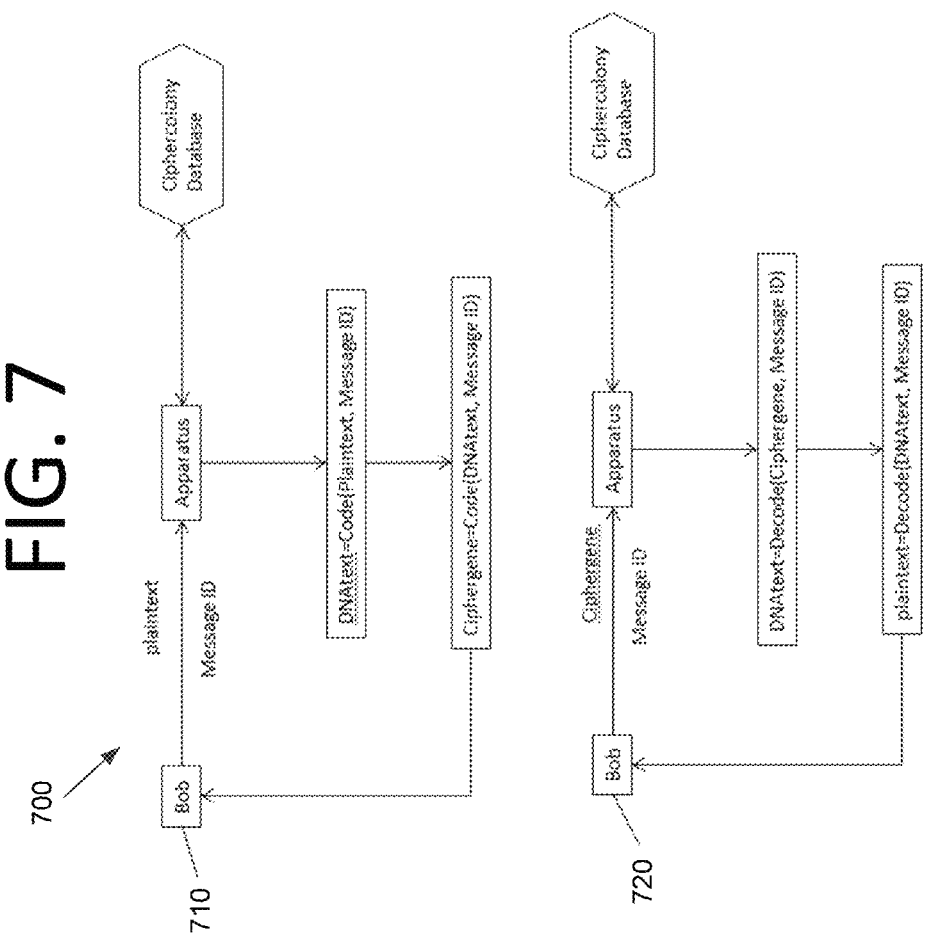
FIG. 7 is a flowchart, illustrating Layer 1 processing, according to an embodiment of the present invention.
Figure 19:
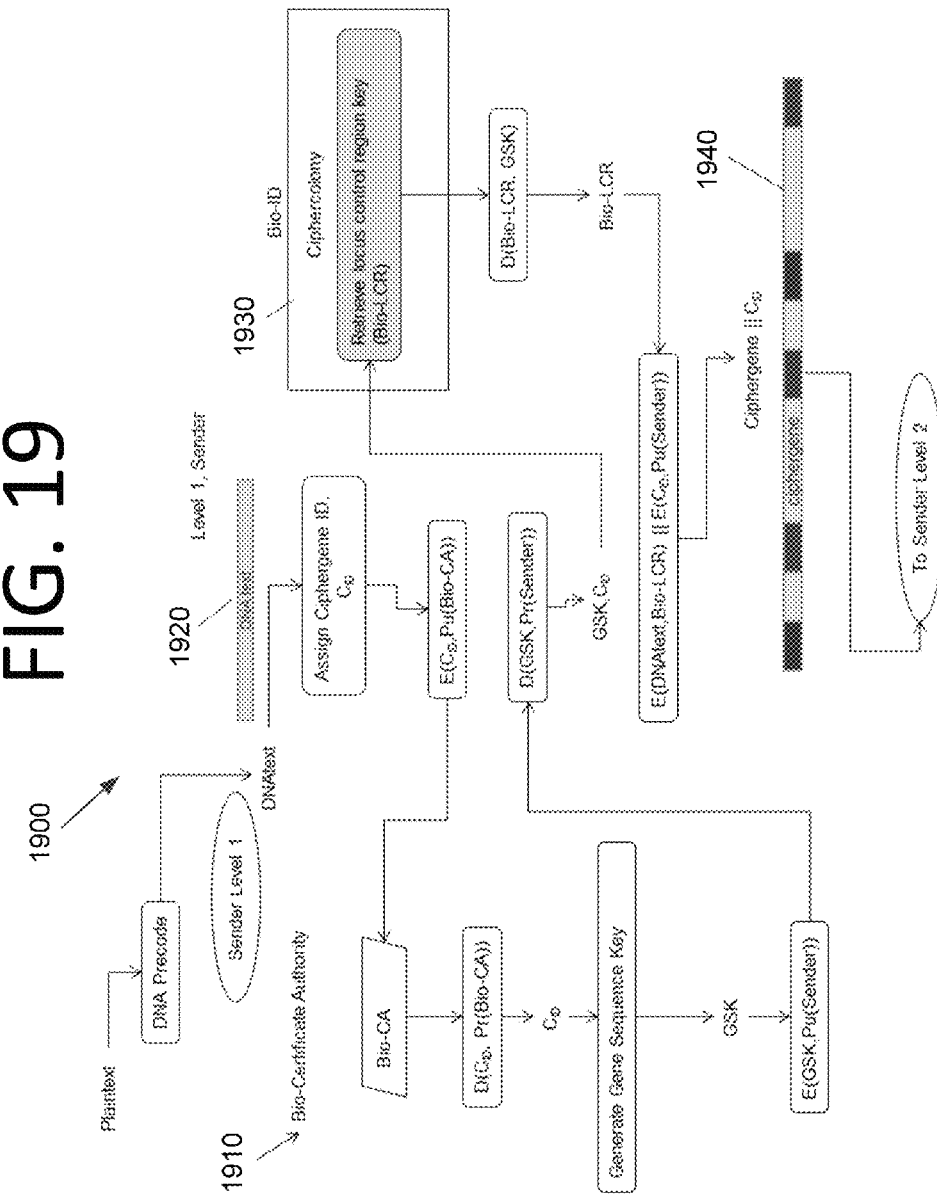
FIG. 19 is a flowchart illustrating Level 1 of the encryption process, according to an embodiment of the present invention.

A Level 1 implementation 610 of the protocol involves converting plaintext into DNAtext and converting DNAtext into a ciphergene. This process is further discussed with respect to FIG. 7, according to an embodiment of the present invention. FIG. 7 is a flowchart 700 detailing "Bob's" encryption of a plaintext message to a ciphergene at 710 and decryption of a ciphergene to DNA text at 720. Bob provides a plaintext message for encryption and a DNAtext message for decryption. Plaintext may be encoded into DNAtext using protocols such as those described in parent patent application Ser. No. 13/211,432 in embodiments involving one-way authentication and a message ID corresponding to the message authentication code from parent patent application Ser. No. 13/211,432. Plaintext with a message ID derived from another source may be encoded with the process identified in FIG. 17 if two-way confidentiality is required. FIG. 19 summarizes an example of a Level 1 encryption of a plaintext message to a ciphergene. The parties are a Certificate Authority 2110 with a BioID and a User 2120 with a BioID.

Figure 8:
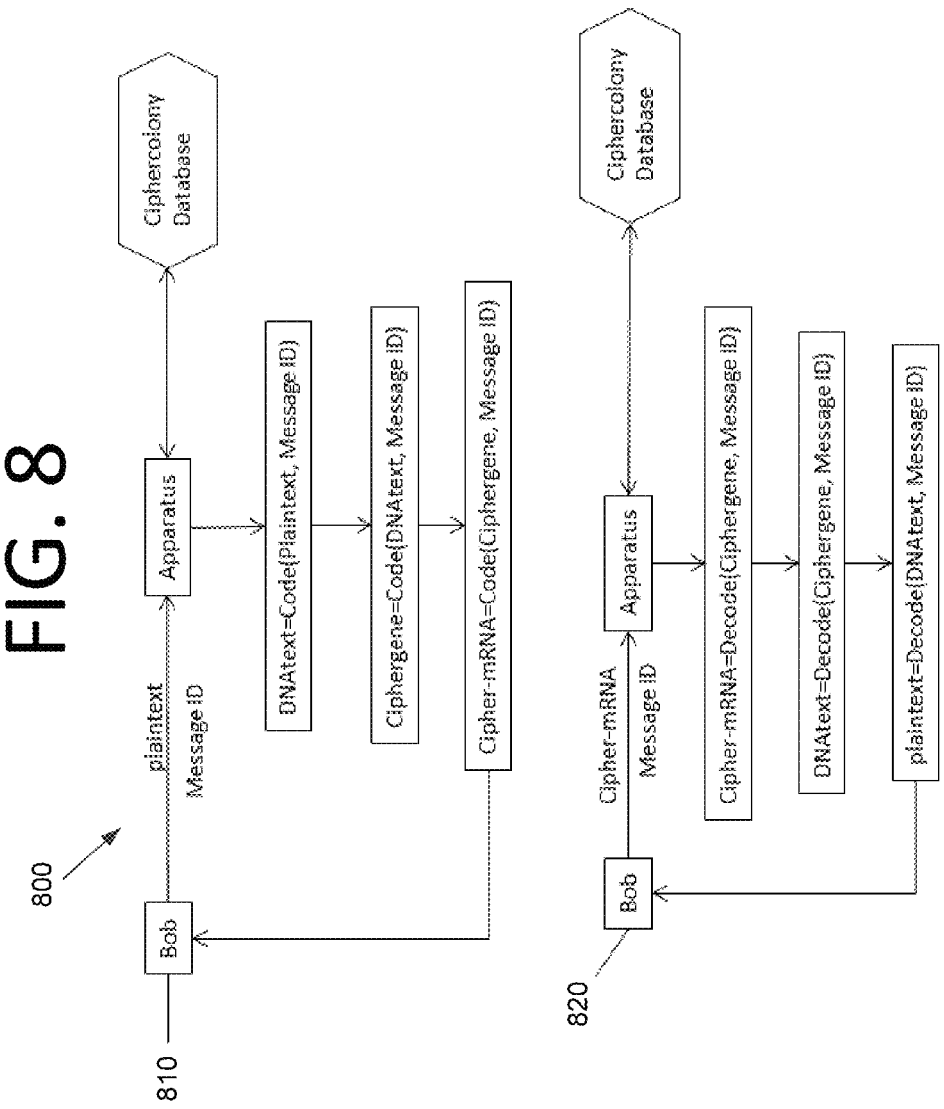
FIG. 8 is a flowchart illustrating Layer 1 and Layer 2 processing, according to an embodiment of the present invention.

A two level implementation of the protocols is shown in FIG. 8, according to an embodiment of the present invention. Utilization of Level 1 and Level 2 protocols is summarized in flowchart 800 in FIG. 8, which details "Bob's" encryption of a plaintext message to a cipher-mRNA at 810 and decryption of a cipher-mRNA to DNAtext at 820. Bob provides a plaintext message for encryption and a ciphergene message for decryption.

Also using the second level instead of using the first level alone increases the cryptographic hardness of the protocol. A malfeasor cannot be sure that the message is the correct message due to the possibility of alternative splicing, or a "polycistronic" feature, increasing confusion by making the relationship between the plaintext and the ciphertext more complex. Epigenetic markers (e.g., cytosine methylation, CpG islands where cytosine and guanine are separated by only one phosphate, etc.) may be added at Level 2.

Figure 9:
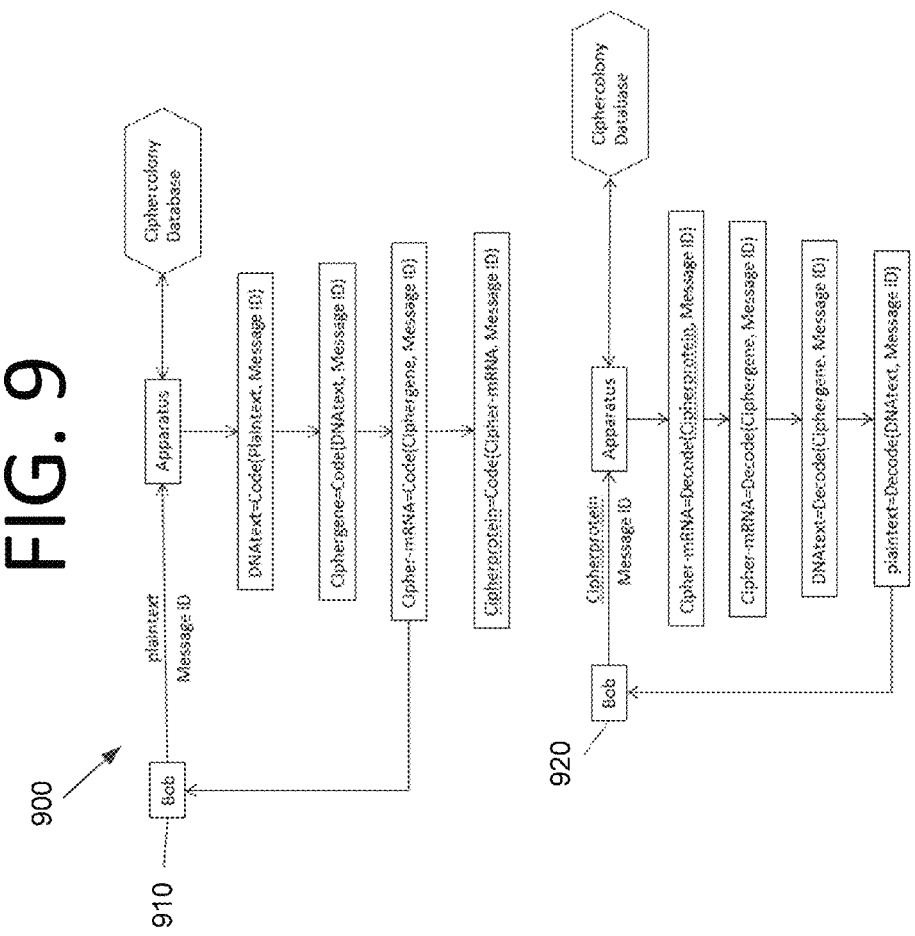
FIG. 9 is a flowchart illustrating Layer 1, Layer 2, and Layer 3 processing, according to an embodiment of the present invention.

A three level implementation of the protocols is shown in FIG. 9. Utilization of Level 1, Level 2, and Level 3 protocols is summarized in flowchart 900 in FIG. 9, detailing "Bob's" encryption of a plaintext message to a cipherprotein at 910 and decryption of a cipherprotein to DNA text at 920. Bob provides a plaintext message for encryption and a cipherprotein message for decryption.

Also using the third level instead of using the first two levels alone further increases the cryptographic hardness of the protocol. A malfeasor cannot be sure that the message is the correct message due to the multiple mappings of cipher-mRNA into possible cipherprotein codes, making the relationship between the plaintext and the ciphertext more complex. The cipher basal transcriptional complex may allow decoding of one pre-transcriptional complex ("PTC") into multiple mRNA products as another form of control and additional leveraging of a single genomic code into multiple products. An RNA polymerase database may be used by the system to select which RNA polymerase family to use for transcription and the necessary conformational and folding information and binding points to the transcription factor ("TF") and DNA by the enzyme. Higher level functions, such as Histone code functionality, and higher level structural processing at the nucleosome or chromatin level (e.g., chromatin remodeling, if desired) may be added at Level 3. Additional post-transcriptional editing (e.g., Adenosine Deaminase ("ADAR") editing) and post-translational protein modifications can be added at Level 3.

Nomenclature

The encryption operation is denoted by "E". E(subject, Pu(key)) means encrypt the subject with the public key of the sending entity. E(subject, key) means encrypt the subject with the symmetric key. For example, E(DNAtext, Bio-LCR) means encrypt the subject DNAtext with the symmetric key Bio-LCR.

The decryption operation is denoted by "D". D(subject, Pr(key)) means decrypt the subject with the private key of the sender. D(subject, key) means decrypt the subject with the symmetric key. For example, D(Bio-LCR, GSK) means decrypt the subject Bio-LCR with the symmetric key GSK.

The hash function is denoted by "H". H(subject, key) means apply the hash function to the subject using the key. For example, H(pc, pss) means apply the hash function on pc using the key pss. The hash function referred to in the present disclosure may be the one described in parent patent application Ser. No. 13/211,432.

The concatenation function is denoted by the symbol ||. For instance, String1||String2 appends String2 to String1.

Complex operations involving multiple steps use a pseudocode shorthand such as Code, Decode. Generate, or Comp. Code (subject, identifier) means perform a serious of operations on the code or transform the subject based upon the operand identifier. Decode (subject, identifier) means perform the inverse operation of Code. Gen(operand, operand, operand) means generate data based upon contents of the operands. Comp means take the complement (convert 1 to 0, and vice versa) of the operand.

Figure 10:
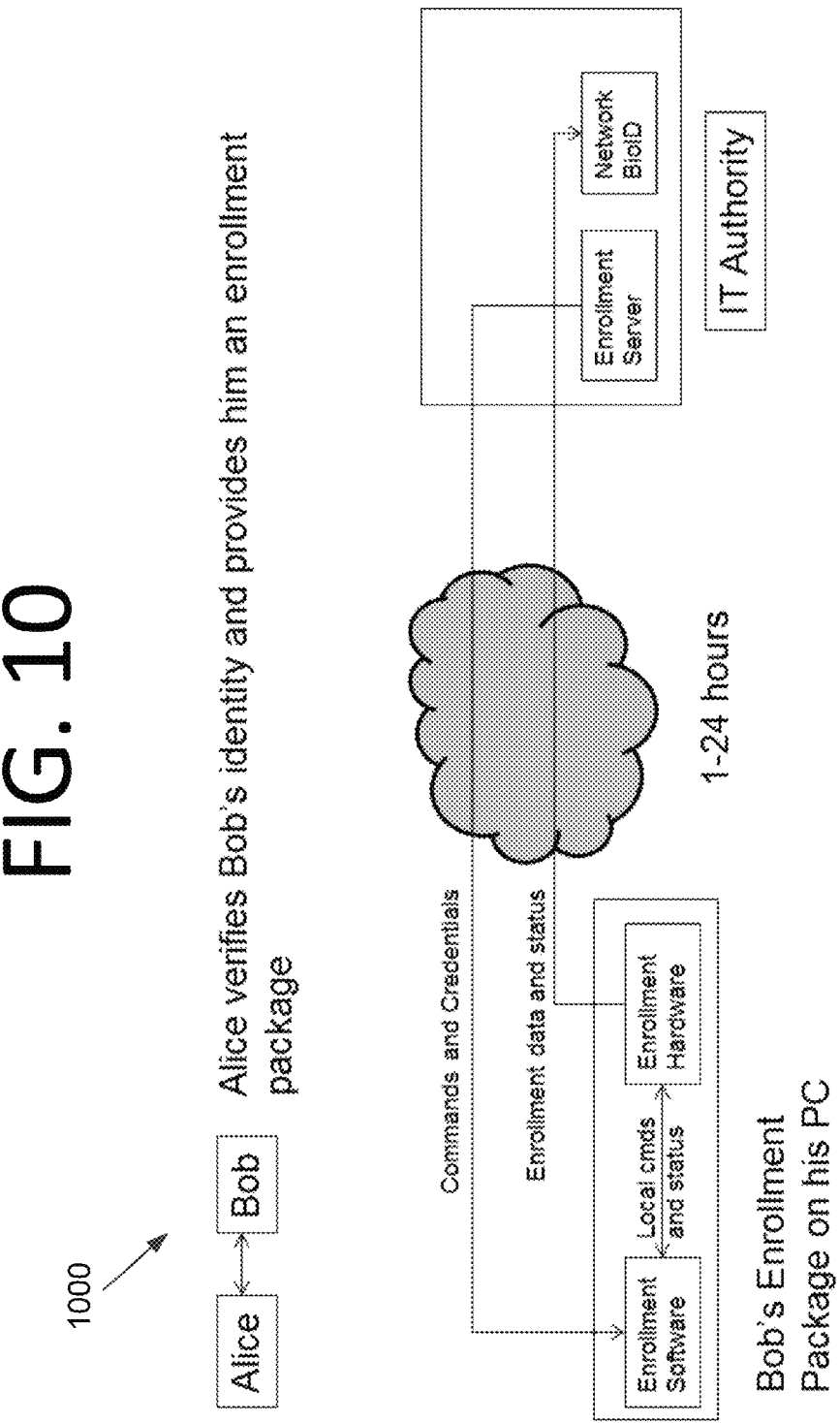
FIG. 10 is a message flow diagram summarizing a user enrollment process, according to an embodiment of the present invention.

FIG. 10 depicts a message flow diagram 1000 that illustrates the process of enrollment using "Alice" as the verifier of "Bob's" identity. Customers and users must be physically verified and undergo an enrollment procedure. In the enrollment procedure, user identities are confirmed and distribution of enrollment software and hardware is performed. The user makes initial contact with the network to setup BioID credentials. Successful enrollment permits the user to gain access to the integrated genomic proteomic toolset of software and hardware. The security of the protocols is based upon biological authentication, biological encryption keys, etc. Therefore, enrollment has a biological aspect to avoid vulnerabilities of current enrollment systems.

The enrolling customer receives shrinkwrap software (or downloads instructions from a secure website) with product key(s) that are computationally difficult to forge in polynomial time. The enrolling customer also receives a disposable enrollment bioreactor, water, yeast, sugars, and other suitable ingredients, a microelectricalmechanical systems ("MEMS") "lab on a chip" bioreactor, cell-free lysates, and yeast or other flora that have been taken from cultures that have been carefully evaluated for gene expression products and characteristics. The customer plugs the bioreactor into a universal serial bus ("USB") port and follows the instructions.

A MEMS lab extracts culture data on a set of a "few" secret culture characteristics, $\{G_1, G_2, \ldots, G_n\}$. These characteristics are coded with the product key(s) and transmitted for evaluation and generation of user credentials. The customer receives a non-transferable BioUser ID ($BU_{ID}$) and a set of non-transferable ciphergene IDs ($C_{ID}$) uniquely traceable to the product keys and product registration. After completion of registration and receipt of credentials (1-24 hours), the customer may dispose of the bioreactor in the same way one would dispose of memory sticks or batteries.

The entire process is no more hazardous than brewing beer or making bread dough when suitable flora are used, such as yeast. The complexity of enrollment is proportional to customer network requirements. Large installations may utilize many enrollment bioreactors. Once enrolled, customers are eligible to purchase BioID systems.

Figure 11:
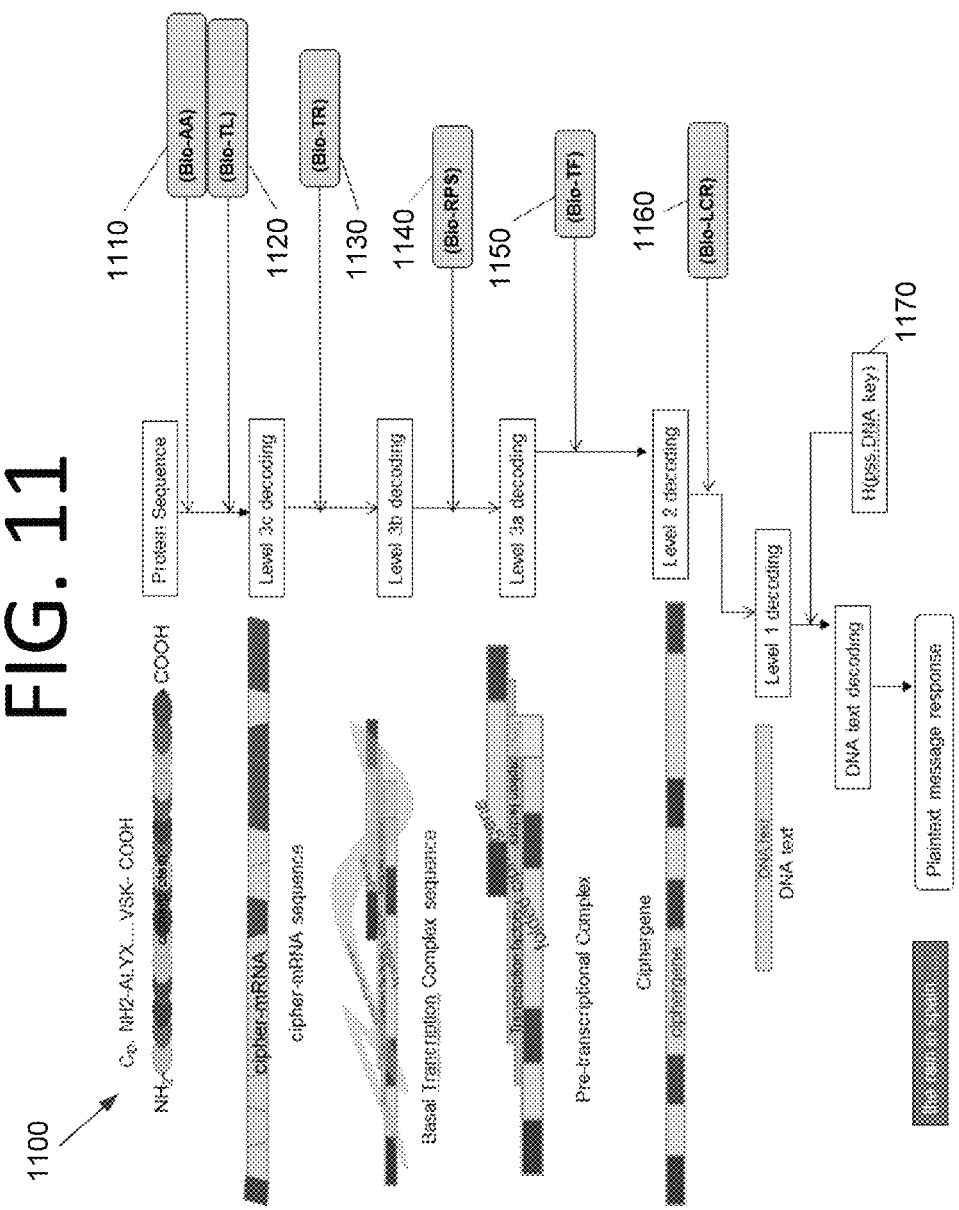
FIG. 11 is an example of a cipherprotein message from the ciphercolony translated to a plaintext message for use in a challenge/response authentication process, according to an embodiment of the present invention.

FIG. 11 depicts an example 1100 of the translation of cipherprotein message to a plaintext message for the purposes of an authentication challenge and response as might be undertaken by an IT security authority, according to an embodiment of the present invention. The challenger supplies a cipherprotein sequence that corresponds to a single plaintext message response. If the responder has the correct credentials, it will encrypt the plaintext message to the unique cipherprotein. The subset of symmetric encryption keys used are Amino Acid Coding Encryption Keys (Bio-AA) 1110, Translation Instruction Encryption Keys (Bio-TL) 1120, Transcription Instruction Encryption Keys (Bio-TR) 1130, RNA Polymerase Encryption Keys (Bio-RPS) 1140, Transcription Factor Encryption Keys (Bio-TF) 1150, and Control Region Encryption Keys (Bio-LCR) 1160. H(pss, DNA key) is denoted by 1170.

Figure 12:
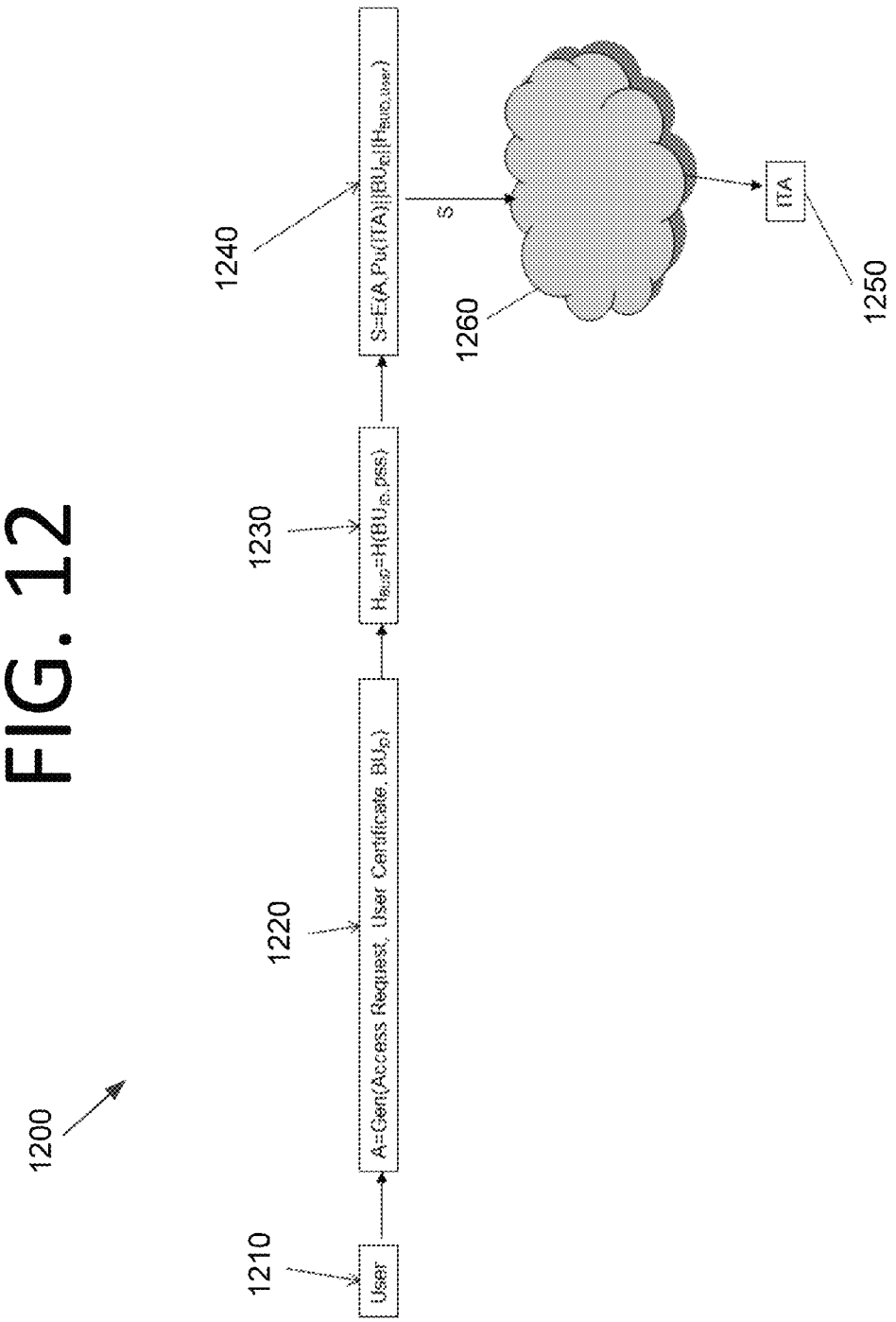
FIG. 12 is a message flow diagram of step 1 of a four step authentication process: user requests access (to Web Server, E-mail Server, VPN firewall, Cloud, etc.) from IT Authority ("ITA"), according to an embodiment of the present invention.

FIGS. 12 through 15 depict a scenario involving proteomic message challenge/response authentication. In FIG. 12, the first step 1200 of the process is depicted. A user 1210 generates an Access Request 1220 and supplies a Certificate from a recognized Certificate Authority (CA). The User Certificate contains the usual legacy CA information, plus a BioUser ID ($BU_{ID}$), which identifies the user as possessing additional credentials for access to this protected resource. At 1230, a hash of the $BU_{ID}$ is created and at 1240, a message encrypted with the public key of ITA authority 1250 containing the credentials of user 1210 is sent to the ITA in message S over the Internet 1260. Assuming all other authentication data is acceptable, ITA 1250 verifies the $BU_{ID}$ and issues a valid session key or ignores the network request, thus depriving the user of any valid network responses that could be used in a subsequent attack.

Figure 13:
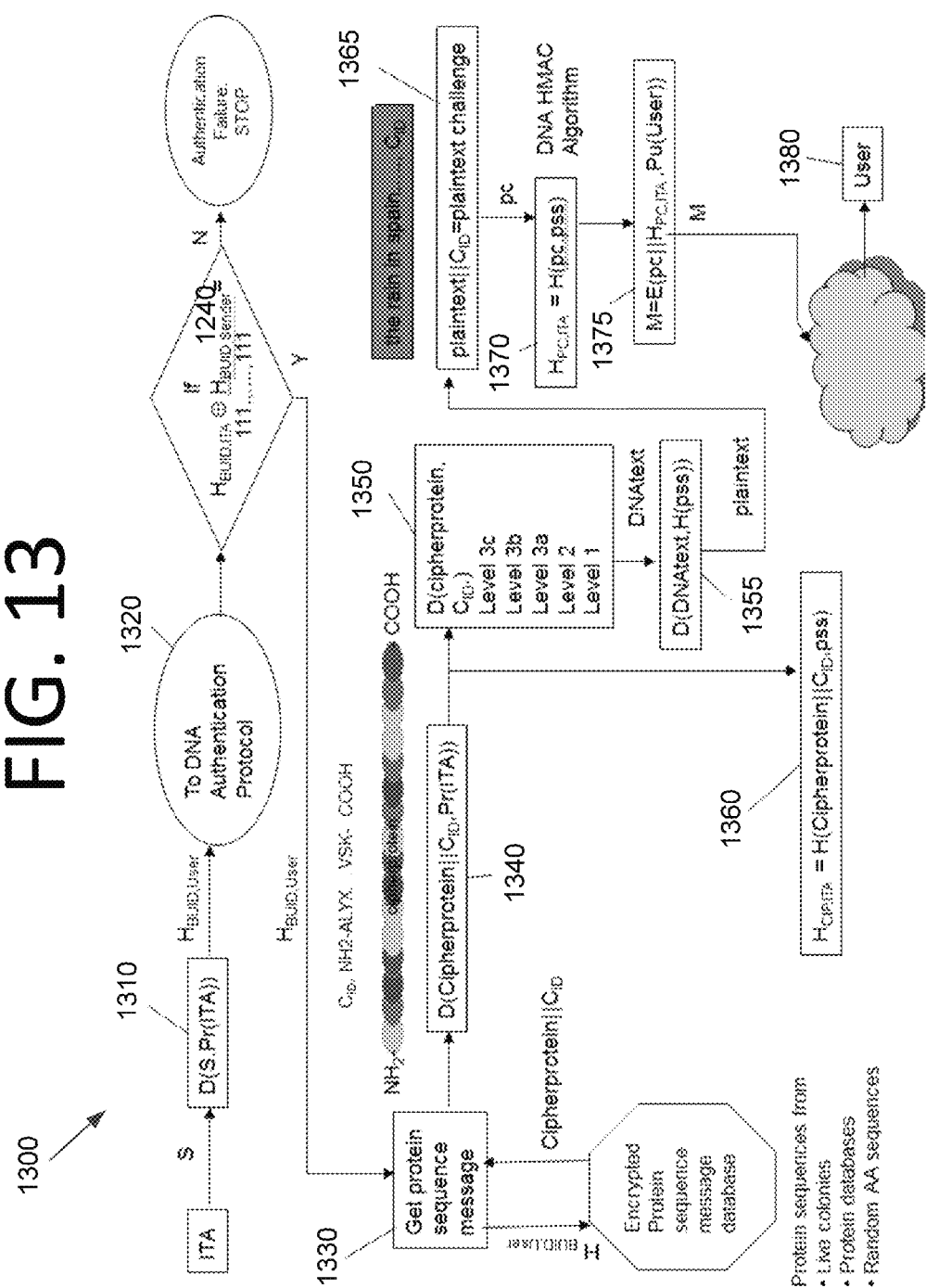
FIG. 13 is a message flow diagram of step 2 of the four step authentication process: challenge (from Web Server, E-mail Server, VPN firewall, etc.), according to an embodiment of the present invention.

FIG. 13 illustrates the next step 1300 in the authentication process by verifying the credentials in message S, according to an embodiment of the present invention. The ITA decrypts S using their private key and executes the DNA authentication protocol from patent application Ser. No. 13/211,432 at 1310. If the authentication is successful at 1320, the ITA retrieves the cipherprotein message and $C_{ID}$ specified by the user $BU_{ID}$ from the protein message database as shown in FIG. 11 and depicted by 1330. The cipherprotein$\|C_{ID}$ sequence is decrypted at 1340 with the private key of the ITA for use in steps 1350 and 1360. The cipherprotein sequence is decrypted to a plaintext message at 1350 and 1355 for use in plaintext challenge message creation at 1365. A number of products are created for a challenge authentication message, and a keyed hash of the cipherprotein concatenated with the $C_{ID}$, at 1360. A plaintext challenge message is created at 1365. A keyed hash of the plaintext challenge message is created at 1370. A message M, whose contents were created at 1370 and 1375 and encrypted with the public key of the user, is transmitted over the Internet to the user at 1380.

Figure 14:
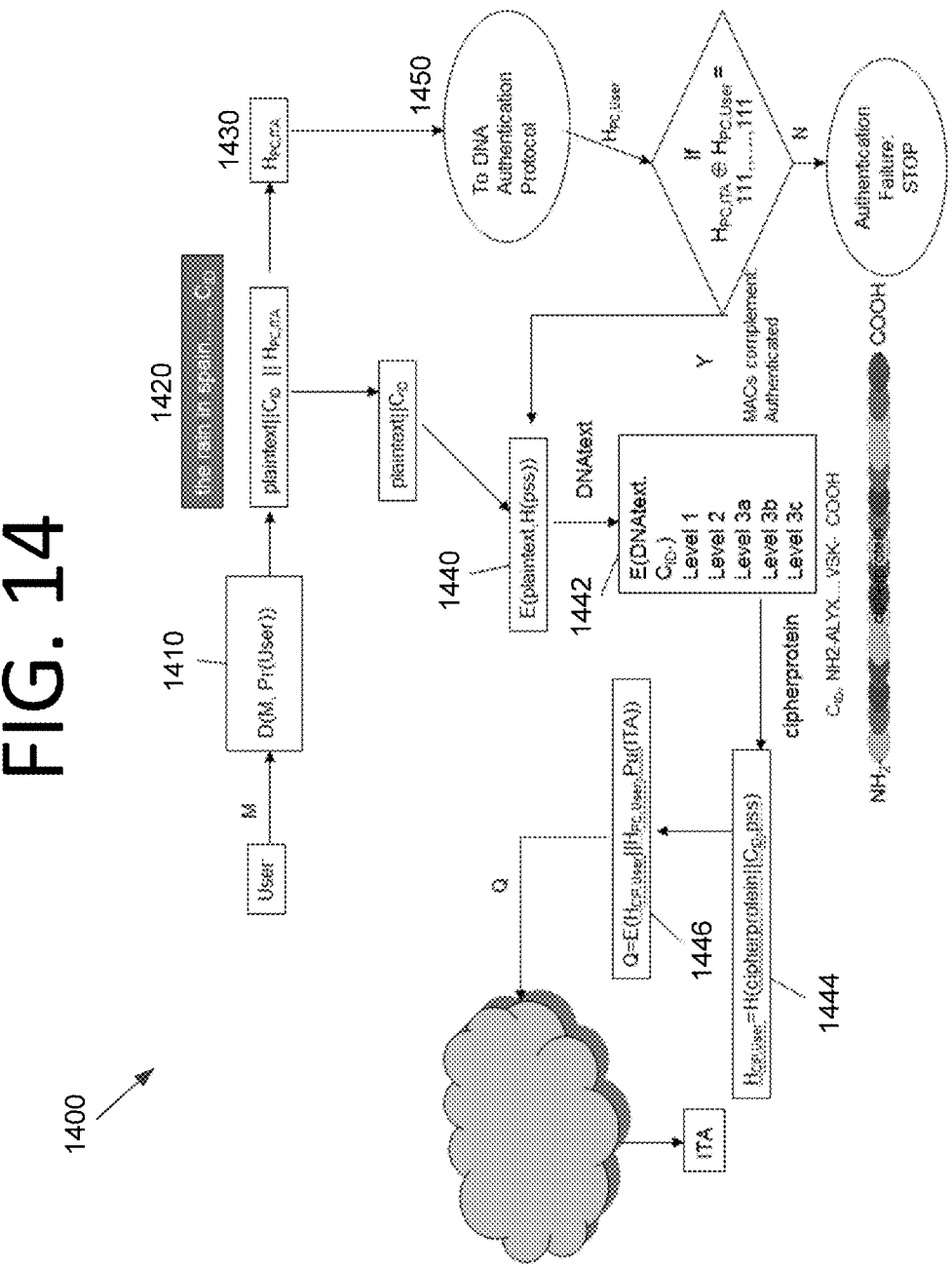
FIG. 14 is a message flow diagram of step 3 of the four step authentication process: user response, according to an embodiment of the present invention.

FIG. 14 illustrates the third step 1400 of the process, beginning with the user responding by first decrypting the message in 1410 with his or her private key. The plaintext at 1420 has the keyed hash code appended by the ITA, which is extracted, and the message contents of 1420 are subjected to the authentication protocol from patent application Ser. No. 13/211,432. If the authentication process is successful, the plaintext of 1420 is encrypted with the keyed hash of the pss at 1440 and the resulting DNAtext is encrypted to a cipherprotein sequence at 1442. The challenge response from the user is created at 1444, hashing the concatenated cipherprotein and CID with the pss hash key. The hash of 1450, computed using the authentication protocol from patent application Ser. No. 13/211,432, is computed with the hash computed at 1114 and encrypted with the public key of the ITA and transmitted as message Q at 1446.

Figure 15:
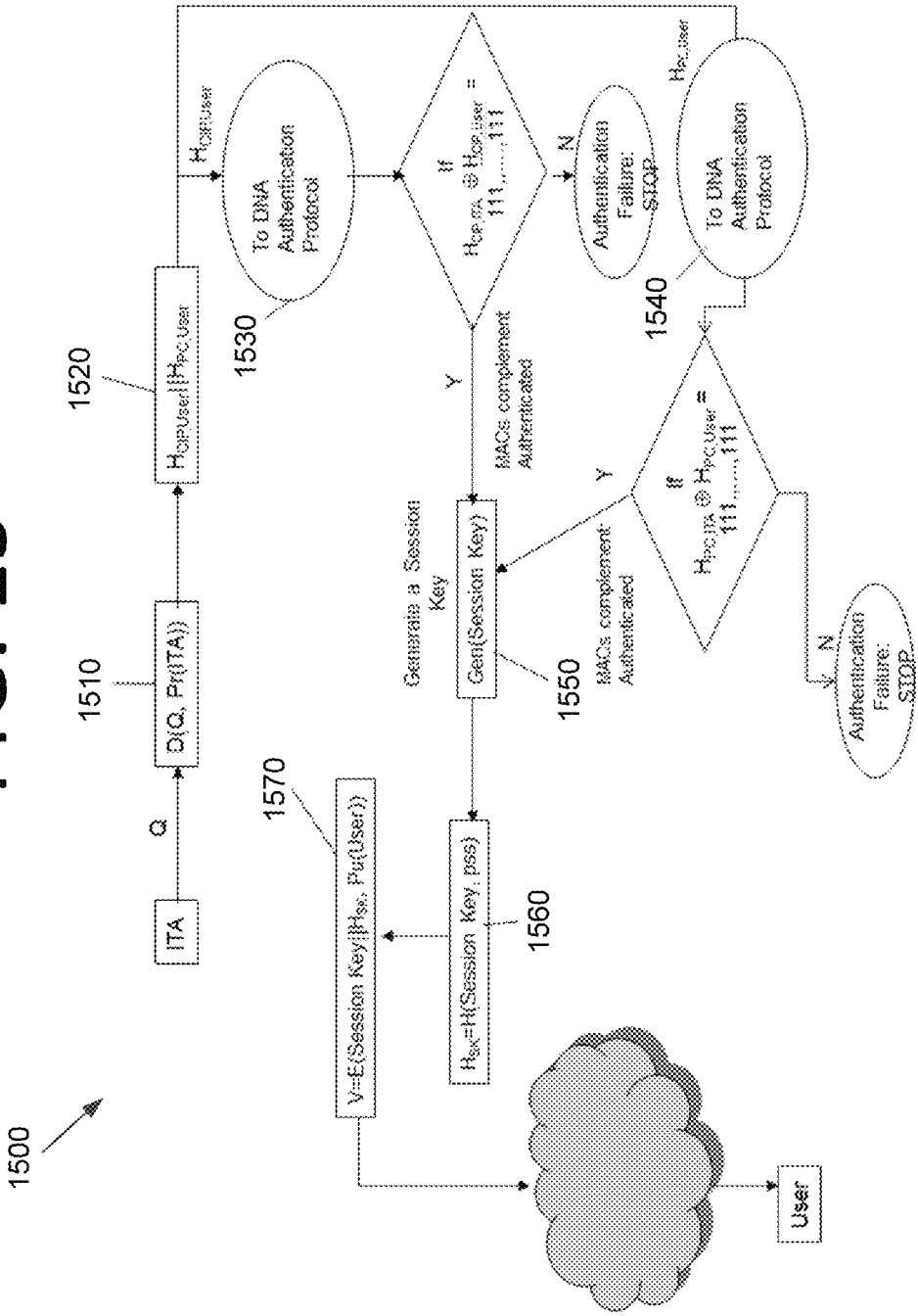
FIG. 15 is a message flow diagram of step 4 of the four step authentication process: ITA authentication acknowledgement (access granted), according to an embodiment of the present invention.

FIG. 15 is the final step 1500 in the process, according to an embodiment of the present invention. The ITA decrypts Q at 1510 with its private key to obtain the hash codes in message Q at 1520. Both hash codes are authenticated at 1530 and 1540 using the authentication protocol from patent application Ser. No. 13/211,432. If the hash codes from 1530 and 1540 pass authentication, the ITA generates a session key for the user at 1550. The session key is hashed with the pss at 1560. The session key and the hash of the session key is encrypted with the public key of the user at 1970 and transmitted to the user over the Internet. The user now has a valid session key to establish a secure session or tunnel as required.

Figure 16:
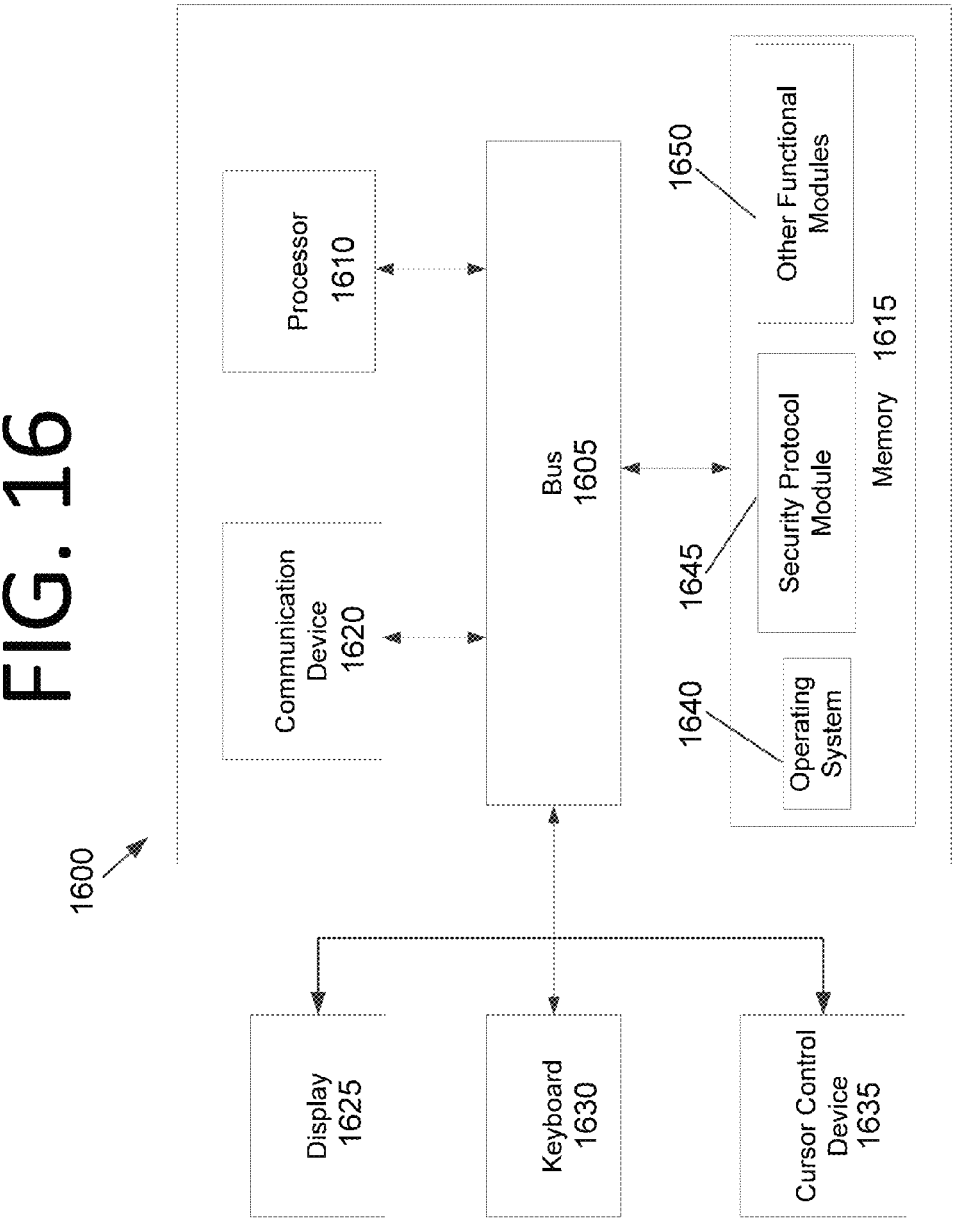
FIG. 16 illustrates a system for performing one or more steps for providing an integrated genomic and proteomic security protocol, according to an embodiment of the present invention.

FIG. 16 illustrates a computing system 1600 for performing one or more steps for providing a genomics-based security protocol, according to an embodiment of the present invention. For example, separate systems may be used by a sender/receiver, a CA, and a third party. System 1600 includes a bus 1605 or other communication mechanism for communicating information, and a processor 1610 coupled to bus 1605 for processing information. Processor 1610 may be any type of general or specific purpose processor, including a central processing unit ("CPU") or application specific integrated circuit ("ASIC"). System 1600 further includes a memory 1615 for storing information and instructions to be executed by processor 1610. Memory 1615 can be comprised of any combination of random access memory ("RAM"), read only memory ("ROM"), flash memory, cache, static storage such as a magnetic or optical disk, or any other types of non-transitory computer-readable media or combinations thereof. Additionally, system 1600 includes a communication device 1620, such as a wireless network interface card, to provide access to a network.

Non-transitory computer-readable media may be any available media that can be accessed by processor 1610 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor 1610 is further coupled via bus 1605 to a display 1625, such as a Liquid Crystal Display ("LCD"), for displaying information to a user. A keyboard 1630 and a cursor control device 1635, such as a computer mouse, are further coupled to bus 1605 to enable a user to interface with system 1600.

In one embodiment, memory 1615 stores software modules that provide functionality when executed by processor 1610. The modules include an operating system 1640 for system 1600. The modules further include a security protocol module 1645 that is configured to implement an integrated genomic and proteomic security protocol. In some embodiments, security protocol module 1645 may perform any of the operations of a sender, receiver, certificate authority, third party, or any other system involved in the security architecture. System 1600 may include one or more additional functional modules 1650 that include additional functionality.

One skilled in the art will appreciate that a "system" could be embodied as a personal computer, a server, a console, a PDA, a cell phone, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory ("RAM"), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Virtual Side Ciphercolony Databases and Keys

Algorithmic Gene Expression Pattern Vectors is a database of probability mass functions of gene expression states in a ciphercolony.

Locus Control Region Encryption Keys (Bio-LCR) Keys encrypt control region information onto DNA text sequences and decrypt the control region information from ciphergene sequences.

Transcription Factor Encryption Keys (Bio-TF) encrypt transcription factor information onto ciphergene sequences and decrypt the transcription factor information from Pre-Transcriptional Complex (PTC) sequences.

RNA Polyermase Encryption Keys (Bio-RPS) encrypt Polymerase information for transcription onto PTC sequences and decrypt the Polymerase information from a Basal Transcriptional Complex ("BTC").

Transcription Instruction Encryption Keys ("Bio-TR") encrypt transcription instruction information onto BTC sequences and decrypt the transcription instruction information from cipher-mRNA sequences.

Post-transcription Editing Encryption Keys ("Bio-PRN") encrypt post-transcription editing information onto BTC sequences and decrypt the post-transcription editing information from cipher-mRNA sequences.

Translation Instruction Encryption Keys ("Bio-TL") encrypt translation instruction information onto cipher-mRNA sequences and decrypt the translation instruction information from cipherproteins.

Post-translation Editing Encryption Keys ("Bio-PTL") encrypt post-translation editing information onto cipher-mRNA sequences and decrypt the post-translation editing information from cipherproteins.

Amino Acid Coding Encryption Keys ("Bio-AA") encrypt cipher-mRNA codons into single letter amino acid codes and decrypt the cipher-mRNA codons from cipherproteins.

DNA Chromosome(s) Authentication Keys ("Bio-DNA") is a database of DNA sequences for use in one-way hash authentication codes and two way encryption processes. DNA keys come from this database.

Gene Expression Authentication Keys ("Bio-GE") encrypt a gene expression protocol (message) for a specified protein within a protein sequence and decrypt the message within the protein sequence to cause expression of the protein sequence.

Protein Message Database is a database of specific protein sequences that decode to a particular plaintext for authentication purposes.

DNA Message Database is a database of specific DNA sequences that decode to a particular plaintext for authentication purposes.

RNA Message Database is a database of specific RNA sequences that decode to a particular plaintext for authentication purposes.

Plaintext Message Database is a database of plaintext messages that code to a particular sequence in the Protein, DNA, or RNA databases.

Gene Expression state vectors are probability mass functions that express the state of a ciphercolony at a given time.

Gene Expression Fluorescence patterns are images of patterns of expression that have been pre-stored for authentication purposes.

DNA Pre-Coding Steps

Figure 17:
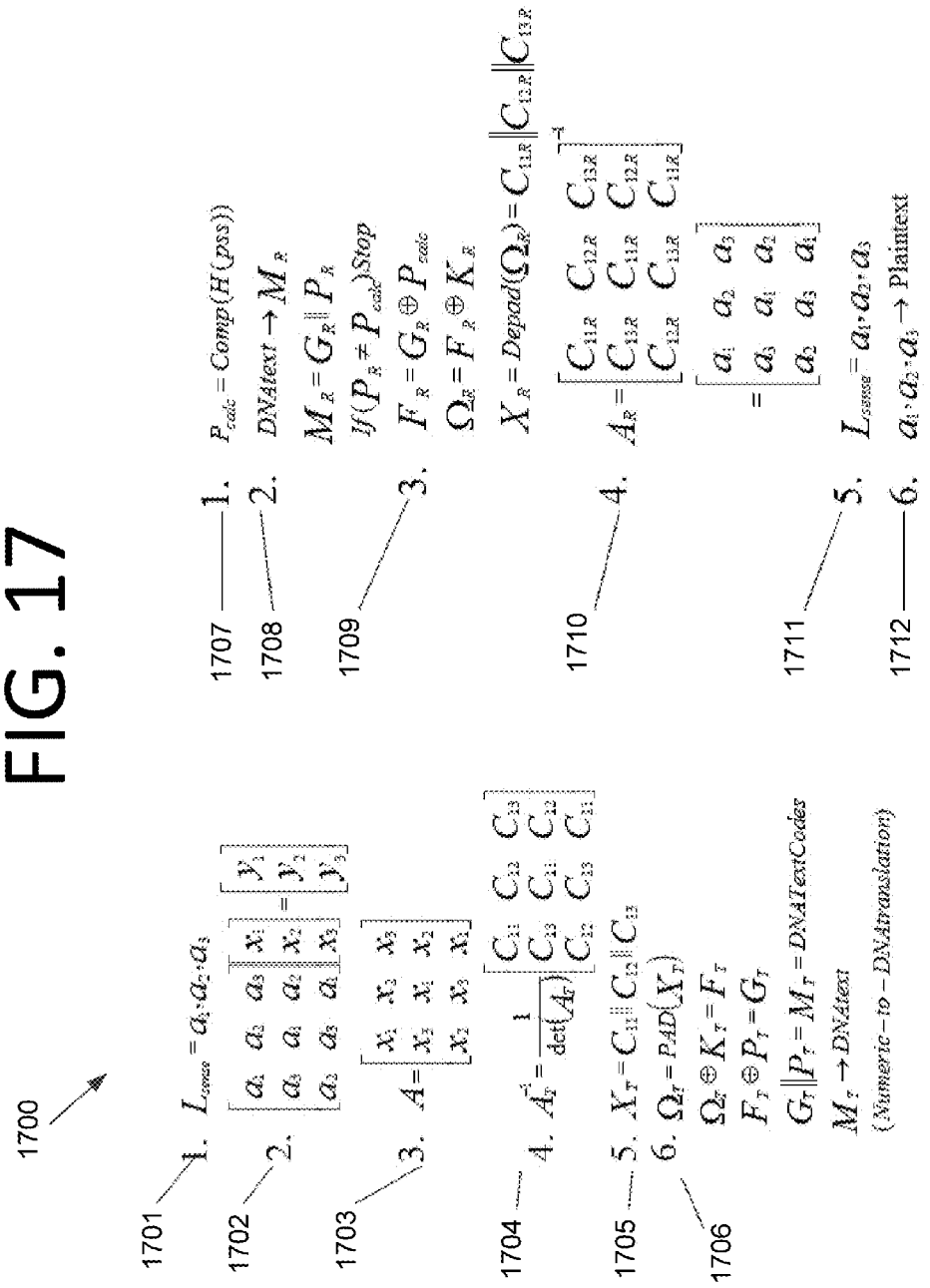
FIG. 17 illustrates equations summarizing the DNA precoding process, according to an embodiment of the present invention.

FIG. 17 details the six steps in converting the plaintext to a DNA coded form, according to an embodiment of the present invention. Nomenclature for this process is as follows:

P=H(pss,DNA key) is a DNA hashcode of pre-shared secret (pss).

$K_T$=Key(pss_checksum) is a pointer to the starting location of the chromosome key (a DNA sequence used for encryption from the Bio-DNA chromosome database of the ciphercolony starting point defined by pss_checksum).

Plaintext=a 3 word block.

$L_{sense}$=Lexicographic representation of a plaintext 3 word block, represented by $a_1$, $a_2$, $a_3$, where these are in the set of positive real numbers.

$y_1, y_2, \ldots, y_n$ are the word positions of $a_1, a_2, \ldots, a_n$.

The hashcode is obtained by the manner discussed in parent patent application Ser. No. 13/211,432. In this embodiment, the hashcode consists of a message authentication code represented by the DNA sequence computed on the pss and checksum computed on the message authentication code (pss checksum).

Next, a chromosome key is obtained by going to the location specified by the integer pss_checksum and reading the sequence from the DNA chromosome database (Bio-DNA) $K_T$=Key(pss_checksum).

A lexicographic representation of the plaintext (in this example, an n-word block, where n=3), a three word block may be obtained by 1701, where $a_1, a_2, a_3$ represent individual words in the plaintext three word block and are in the set of positive real numbers, but any number of words may be used. In the simplest embodiment, $y_1, y_2, \ldots, y_n$ are the word positions of $a_1, a_2, \ldots, a_n$. For example, the word "dog" may take the value 4.157. Alternatively, "dog" can be coded with a prefix-free code such that no ambiguity exists between the coding of successive letters. The word block size can be adjusted as desired to greater than 3, depending upon the computing power of the system. It is thus possible to solve 1702 for 1703. If the ordering of the matrix elements is modified, the successive computations for matrix co-factors should be modified to accommodate the ordering.

The co-factors of A are computed by 1704.

The co-factors are then concatenated by 1705.

For an n-word block, where n>3, the equations are expanded to an n×n matrix and $X_T$ is the concatenation of n co-factors. $X_T$ is then padded out to a length of $K_T$ with uniformly distributed letter codes given by 1706.

A DNAtext message may be computed as shown in 1706. $K_T$ is the result of the XOR function, which codes the padded co-factor values that define the message onto the hash code key. $K_T$ is the result of $K_T$ XOR'd onto the hash code itself, $K_T$. $K_T$ is the concatenation of $K_T$ and $K_T$. The numerical value of $K_T$ is translated by a table to a DNA alphabet consisting only of DNA bases and DNA base derivatives.

Steps 1707 through 1712 reverse the DNAtext coding process to retrieve the original plaintext.

Figure 18:
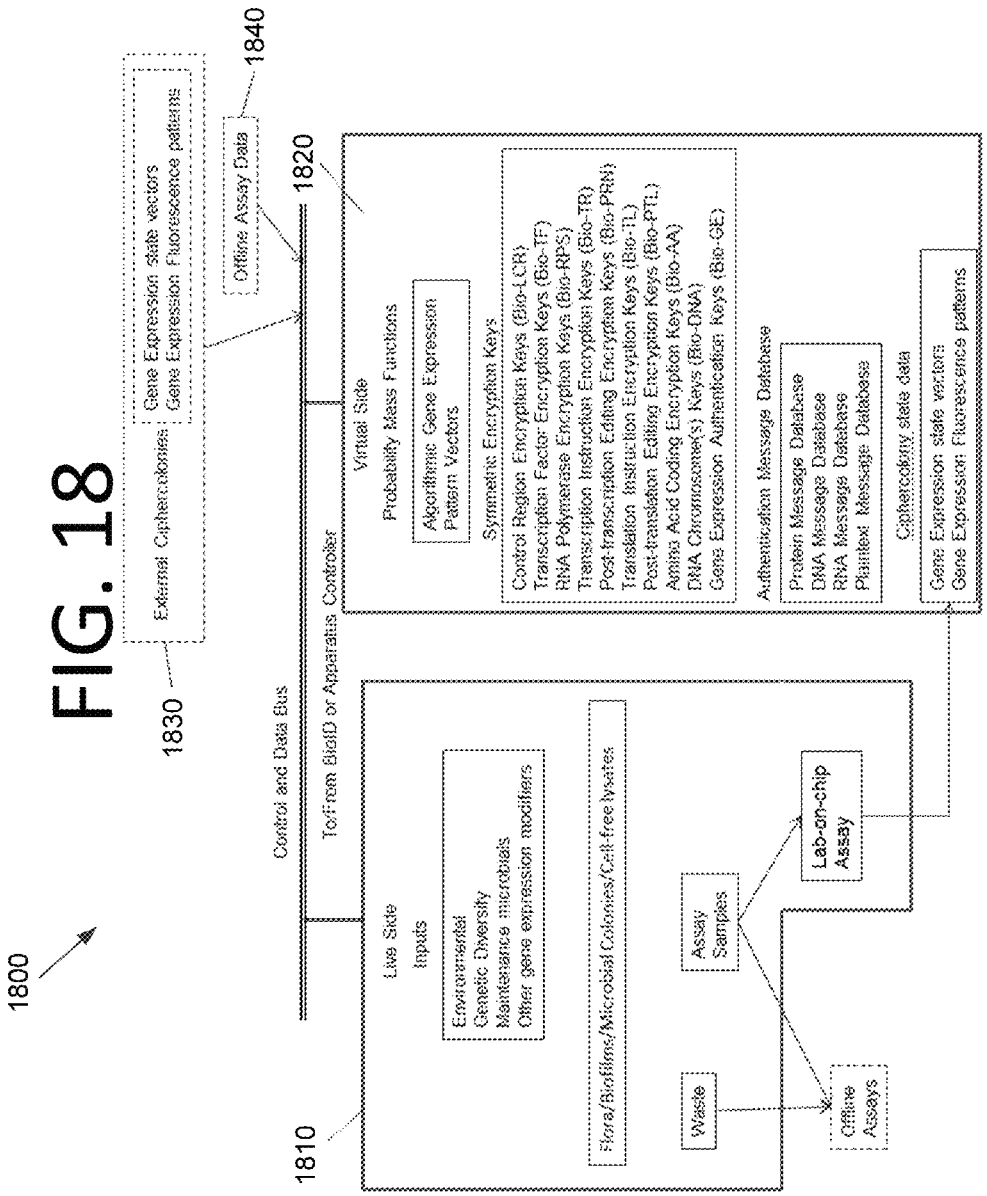
FIG. 18 illustrates a functional block diagram of a ciphercolony inhabited by live flora and algorithms, according to an embodiment of the present invention. Dashed lines indicate functions and inputs from outside the ciphercolony.

Encryption and Decryption Between a Sender, a Receiver and a Certificate Authority One of the possible processes for implementation is an embodiment involving a trusted third party Certificate Authority (Bio-Certificate Authority, Bio-CA), a Sender User and a Receiver User, each possessing all of the required credentials and BioIDs with ciphercolonies configured as shown in FIG. 18. FIG. 18 illustrates a functional block diagram 1800 of a ciphercolony inhabited by live flora 1810 and algorithms 1820, according to an embodiment of the present invention. Dashed lines indicate functions and inputs from outside the ciphercolony, such as external ciphercolonies 1830 and offline data assay 1840.

The Sender User transforms the plaintext message to DNAtext in accordance with the process shown in FIG. 17 and possesses a ciphergene ID ($C_{ID}$) that will map the DNA text to a series of sequences and codes required for encryption at Levels 1, 2, and 3. The Bio-CA possesses encryption keys necessary for the Sender and Receiver Users to retrieve symmetric keys from the ciphercolony to perform the required functions of Levels 1, 2, and 3. The Bio-CA, as shown in 820, possesses the complete set of symmetric and asymmetric encryption keys for both legacy and BioID protocols. The Bio-CA is expected to be geographically isolated from the Sender and Receiver Users. The Receiver User must extract the ciphergene ID ($C_{ID}$) from the received message to retrieve the necessary encryption keys from the Bio-CA needed to extract the symmetric keys from the ciphercolony for message decryption at Levels 3, 2, and 1.

Level 1 Encryption and Decryption

FIG. 19 describes the process 1900 for coding DNAtext 1920 into a ciphergene code 1940, according to an embodiment of the present invention. The Sender encrypts the $C_{ID}$ with a Bio-CA public key and transmits the encrypted $C_{ID}$ to a remote Bio-CA 1910. The Bio-CA decrypts the $C_{ID}$ with its private key and retrieves a Gene Sequence Key Encryption Key (GSK) for the message associated with the $C_{ID}$. The Bio-CA encrypts the GSK with the Sender's public key and transmits the GSK to the Sender. The Sender decrypts the GSK with its private key and retrieves the locus control region key (Bio-LCR) from the BioID ciphercolony database 1930. The Bio-LCR is decrypted with the GSK. The DNAtext is encrypted with the Bio-LCR, converting the DNAtext to a ciphergene. The $C_{ID}$ is encrypted with the public key of the sender and concatenated with the ciphergene for Level 2 encryption at 1940. This completes Level 1 encryption.

Figure 20:
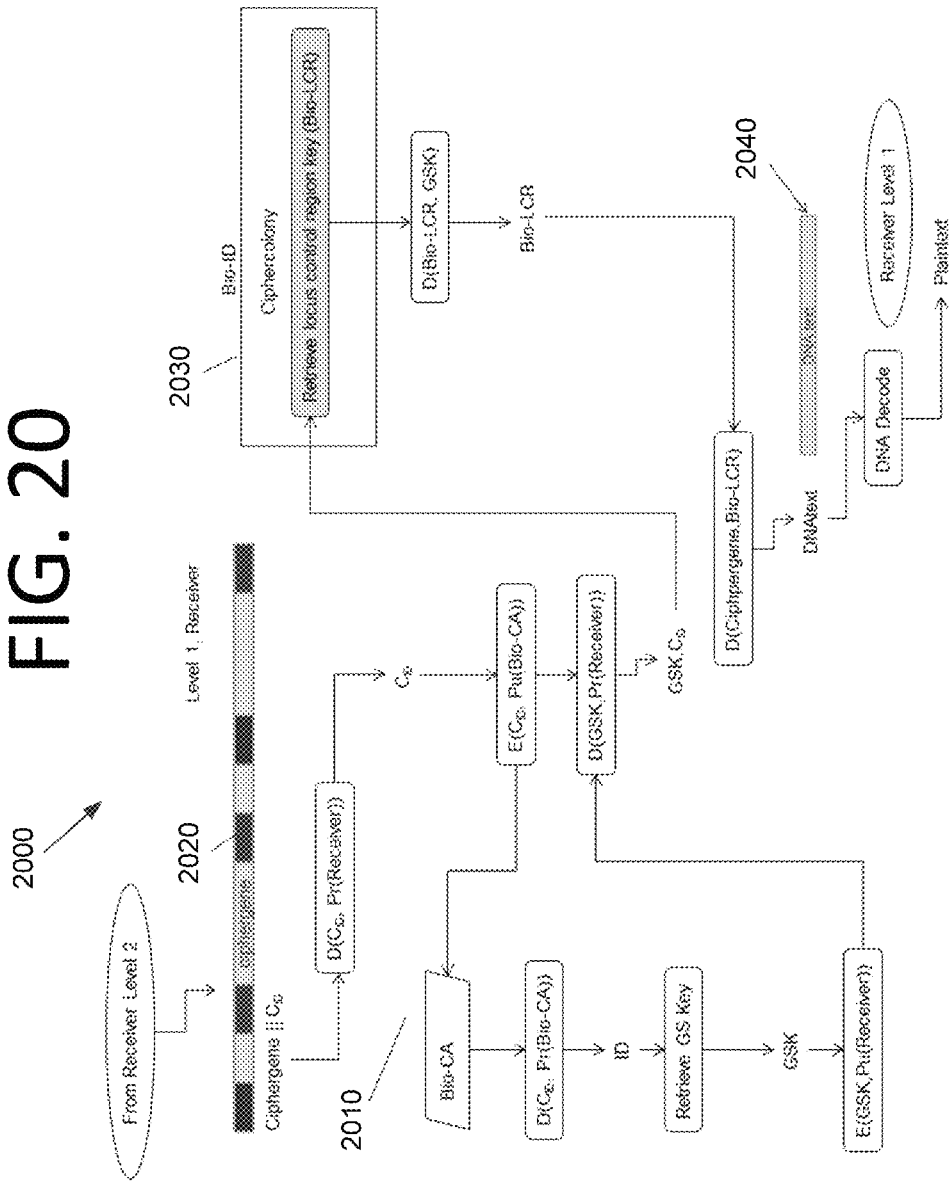
FIG. 20 is a flowchart illustrating Level 1 of the decryption process, according to an embodiment of the present invention.

FIG. 20 describes the process 2000 of decrypting ciphergene‖$C_{ID}$ 2020 to DNAtext 2040, according to an embodiment of the present invention. The $C_{ID}$ is decrypted with the Receiver private key and encrypted with the Bio-CA public key and then sent to remote Bio-CA 2010, decrypted with the Bio-CA private key, and the GSK is retrieved. The GSK is encrypted with the Receiver public key and transmitted to the Receiver. The Receiver decrypts the GSK with its private key and retrieves the Bio-LCR from the BioID ciphercolony database 2030. The Bio-LCR is decrypted with the GSK. The ciphergene is decrypted with the Bio-LCR and converted to DNAtext for Level 1 decryption at 2040. This completes Level 1 decryption. The end result of process 2000 is the plaintext.

Level 2 Encryption and Decryption

Figure 21:
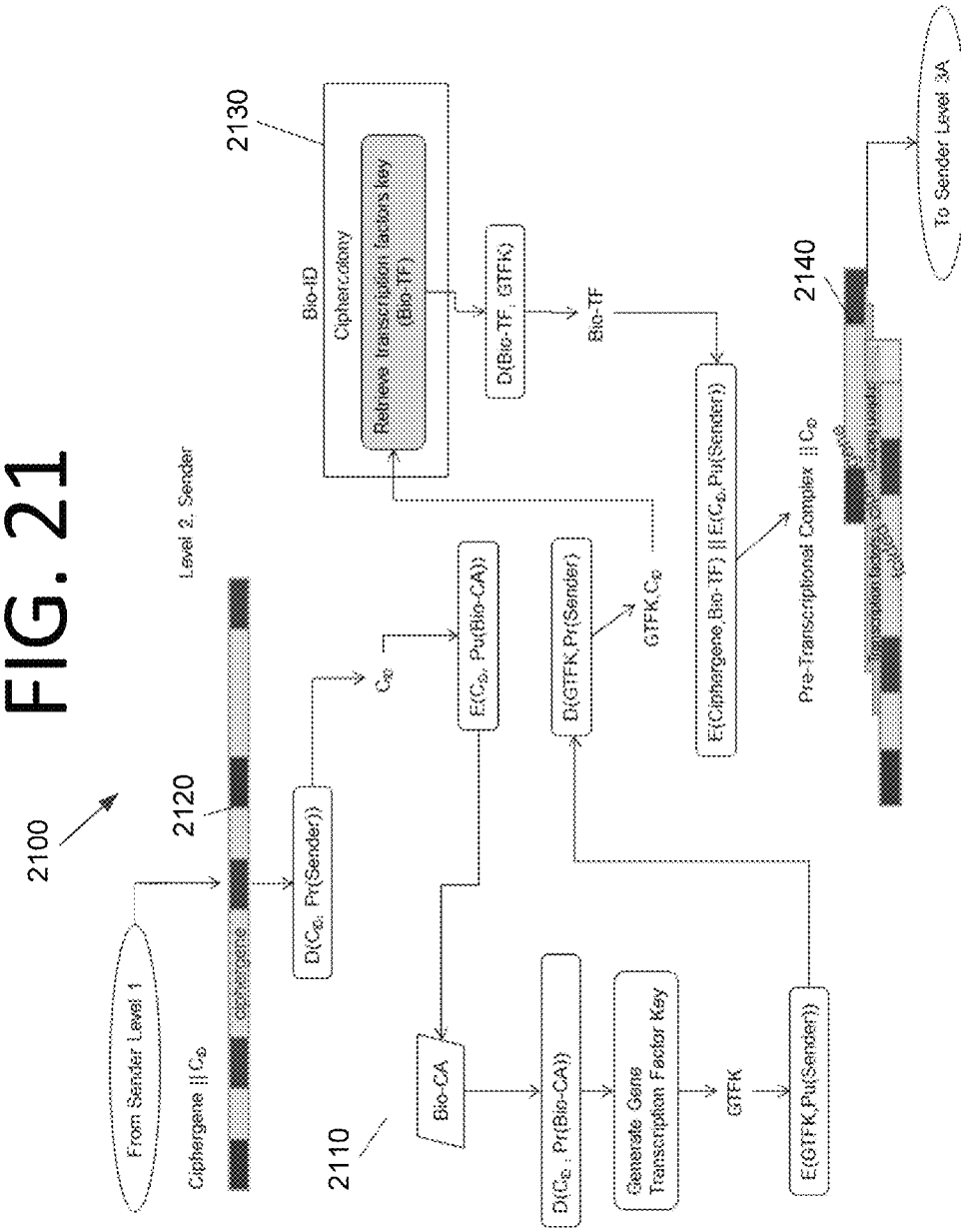
FIG. 21 is a flowchart illustrating Level 2 of the encryption process, according to an embodiment of the present invention.

FIG. 21 describes the process 2100 for coding a ciphergene 2120 into a Pre-transcriptional complex ("PTC") code 2140, according to an embodiment of the present invention. The Sender decrypts the $C_{ID}$ with its private key. The sender encrypts the C with the Bio-CA public key and transmits it to a remote Bio-CA 2110. The Bio-CA decrypts the $C_{ID}$ with its private key and retrieves a Gene Transcription Factor Key Encryption Key ("GTFK") for the message associated with the $C_{ID}$. The Bin-CA encrypts the GTFK with the Sender's public key and transmits the encrypted GTFK to the Sender. The Sender decrypts the GTFK with its private key and retrieves the transcription factor key (Bio-TF) from the BioID ciphercolony database 2130. The Bio-TF is decrypted with the GTFK. The ciphergene is encrypted with the Bio-TF, converting the ciphergene to a PTC. The $C_{ID}$ is encrypted with the public key of the sender and concatenated with the PTC for Level 3A encryption at 2140. This completes Level 2 encryption.

Figure 22:
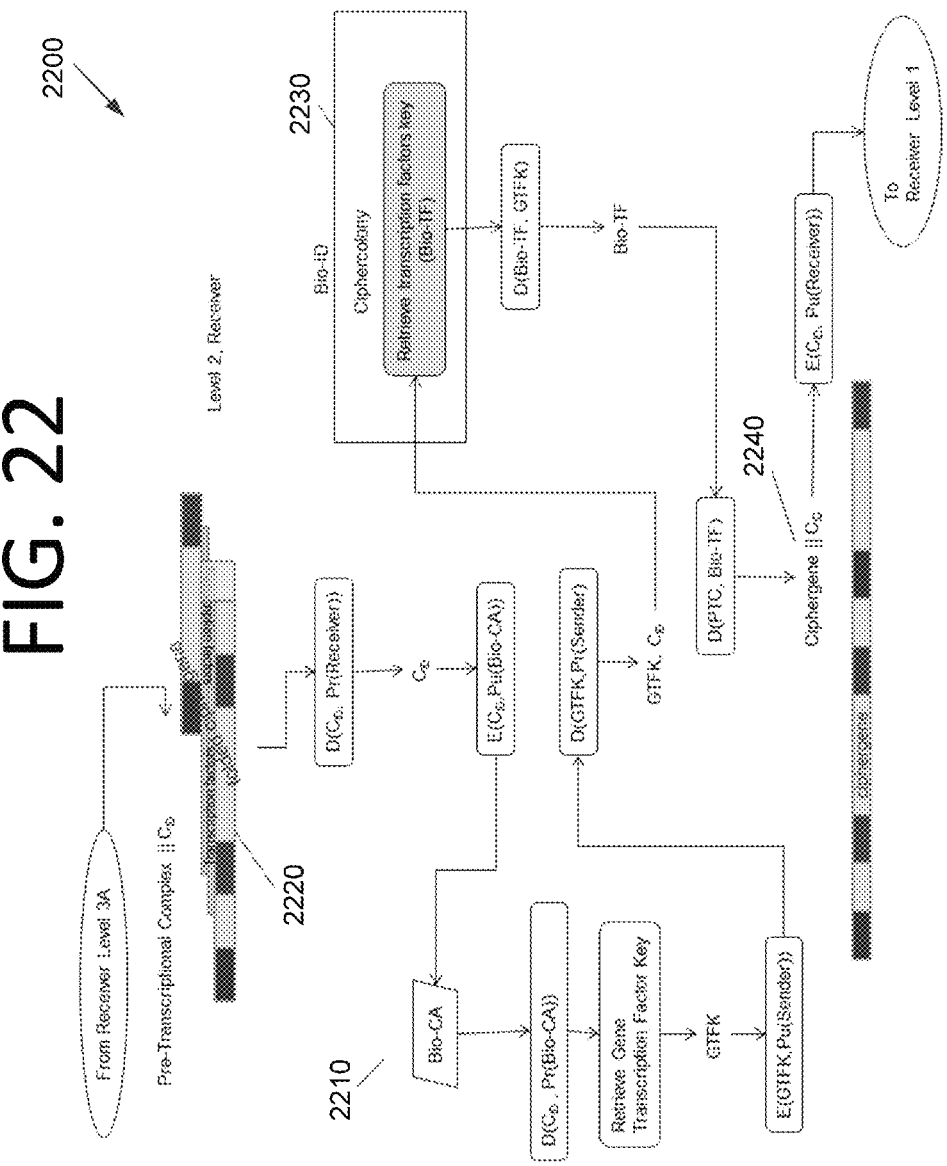
FIG. 22 is a flowchart illustrating Level 2 of the decryption process, according to an embodiment of the present invention.

FIG. 22 describes the process 2200 of decrypting PTC‖$C_{ID}$ 2220 to a ciphergene 2240, according to an embodiment of the present invention. The $C_{ID}$ is decrypted with the Receiver private key and encrypted with the Bio-CA public key and sent to remote Bio-CA 2210, decrypted with the Bio-CA private key, and the GTFK is retrieved. The GTFK is encrypted with the Receiver public key and transmitted to the Receiver. The Receiver decrypts the GTFK with its private key and retrieves the Bio-TF from the BioID ciphercolony database 2230. The Bio-TF is decrypted with the GTFK. The PTC is decrypted with the Bio-TF and converted to the ciphergene. The ciphergene is concatenated with the $C_{ID}$ and encrypted with the Receiver public key for Level 1 decryption at 2240. This completes Level 2 decryption.

Level 3 Encryption and Decryption

Level 3 of the encryption/decryption process has three sub-levels: 3A, 3B, and 3C, as described in more detail below.

Level 3A Encryption and Decryption

Figure 23:
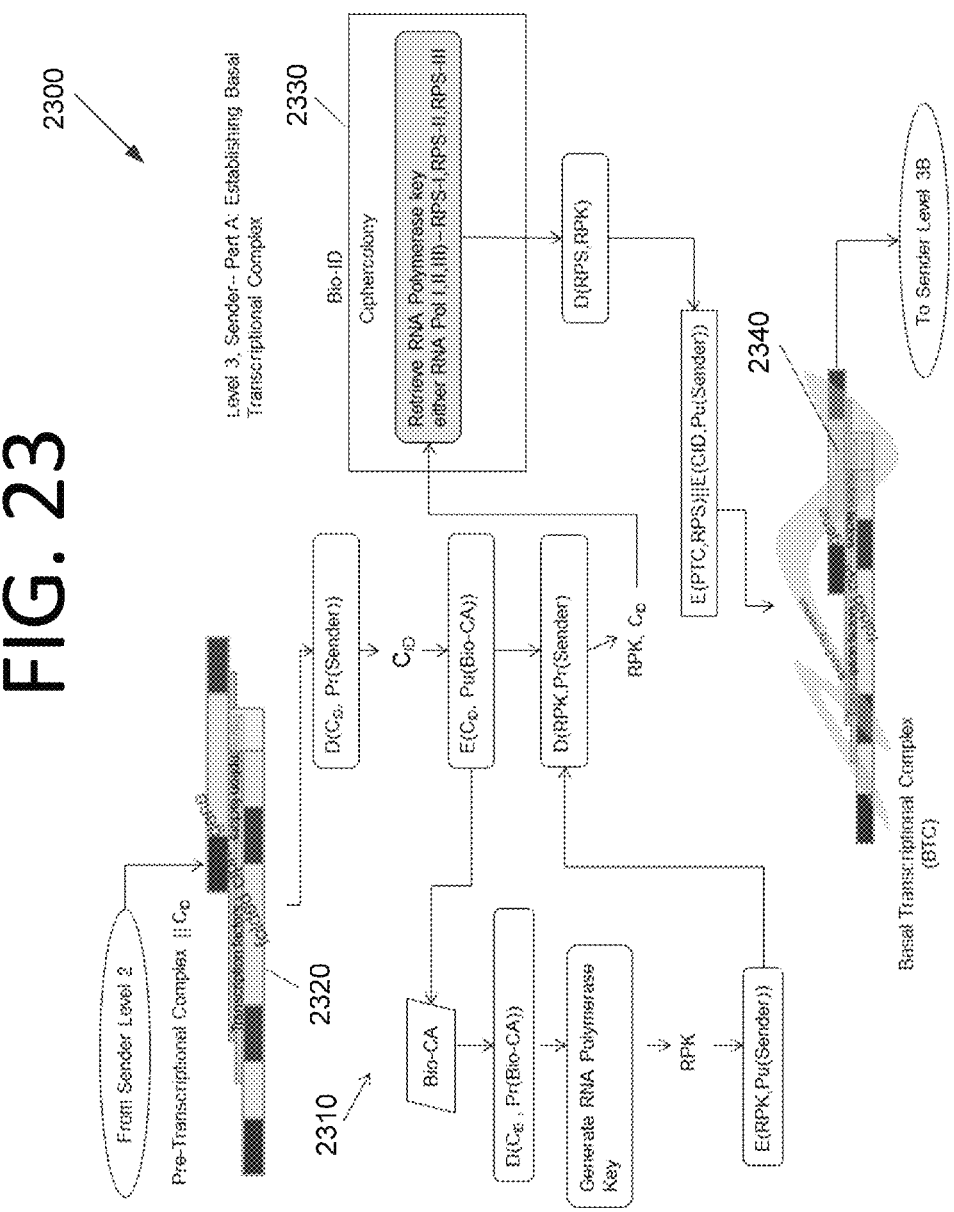
FIG. 23 is a flowchart illustrating Level 3A of the encryption process, according to an embodiment of the present invention.

FIG. 23 describes the process 2300 for coding a PTC 2320 into a Basal Transcription Complex (BTC) code 2340, according to an embodiment of the present invention. The Sender decrypts the $C_{ID}$ with its private key. The sender encrypts the $C_{ID}$ with the Bio-CA public key and transmits the encrypted $C_{ID}$ to a remote Bio-CA 2310. The Bio-CA decrypts the $C_{ID}$ with its private key and retrieves an RNA a Polymerase Key Encryption Key ("RPK") for the message associated with the $C_{ID}$. The Bio-CA encrypts the RPK with the Sender's public key and transmits the encrypted RPK to the Sender. The Sender decrypts the RPK with its private key and retrieves the RNA Polymerase key for the appropriate RNA Polymerase (Bio RPS-1, Bio RPS-II, or Bio RPS-III) from the BioID ciphercolony database 2330. Bio RPS-1, Bio RPS-II, or Bio RPS-III is decrypted with the RPK. The ciphergene is encrypted with Bio RPS-1, Bio RPS-II, or Bio RPS-III, converting the ciphergene to a Basal Transcriptional Complex code (BTC). The C is encrypted with the public key of the sender and concatenated with the BTC for Level 3B encryption at 2340. This completes Level 3A encryption.

Figure 24:
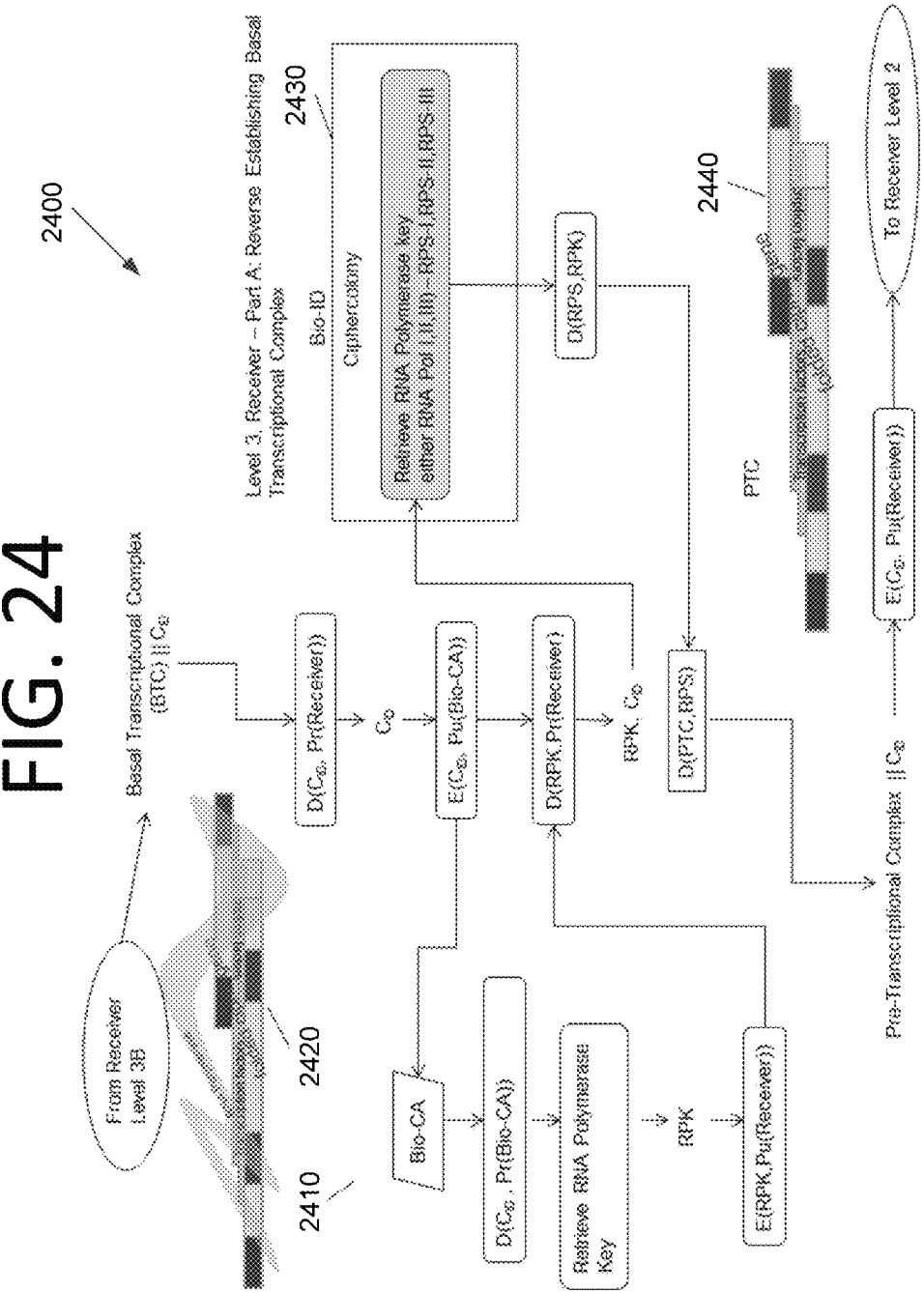
FIG. 24 is a flowchart illustrating Level 3A of the decryption process, according to an embodiment of the present invention.

FIG. 24 describes the process 2400 of decrypting BTC‖$C_{ID}$ 2420 to PTC 2440, according to an embodiment of the present invention. The $C_{ID}$ is decrypted with the Receiver private key and encrypted with the Bio-CA public key and sent to remote Bio-CA 2410, decrypted with the Bio-CA private key, and the RPK is retrieved. The RPK is encrypted with the Receiver public key and transmitted to the Receiver. The Receiver decrypts the RPK with its private key and retrieves Bio RPS-1, Bio RPS-II, or Bio RPS-III from the BioID ciphercolony database 2430. Bio RPS-1, Bio RPS-II, or Bio RPS-III is decrypted with the RPK. The BTC is decrypted with the Bio RPS-1, Bio RPS-II, or Bio RPS-III and converted to the PTC. The PTC is concatenated with the $C_1$ and encrypted with the Receiver public key for Level 2 decryption at 2440. This completes Level 3A decryption.

Level 3B Encryption and Decryption

Figure 25:
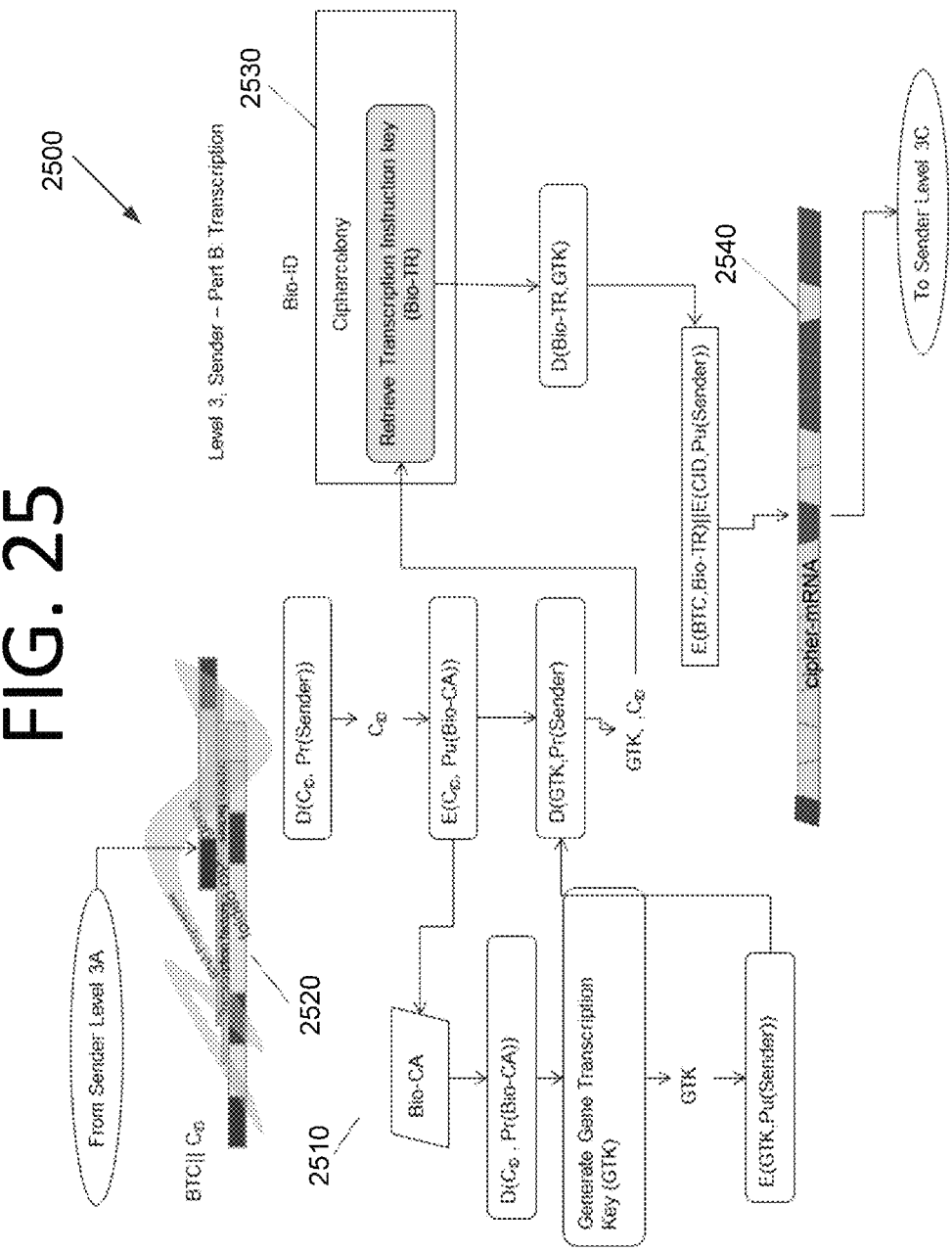
FIG. 25 is a flowchart illustrating Level 3B of the encryption process, according to an embodiment of the present invention.

FIG. 25 describes the process 2500 for coding a BTC 2520 into a cipher-mRNA (c-mRNA) code 2540, according to an embodiment of the present invention. The Sender decrypts the $C_{ID}$ with its private key. The sender encrypts the $C_{ID}$ with the Bio-CA public key and transmits the encrypted $C_{ID}$ to a remote Bio-CA 2510. The Bio-CA decrypts the $C_{ID}$ with its private key and retrieves a Gene Transcription Key ("GTK") for the message associated with the $C_{ID}$. The Bio-CA encrypts the GTK with the Sender's public key and transmits the encrypted GTK to the Sender. The Sender decrypts the GTK with its private key and retrieves the Transcription instruction encryption key ("Bio-TR") for the transcribing and editing the BTC from the BioID ciphercolony database 2530. Bio-TR is decrypted with the GTK. The BTC is encrypted with Bio-TR, converting the BTC to a cipher-mRNA code. The $C_{ID}$ is encrypted with the public key of the sender and concatenated with cipher-mRNA for Level 3C encryption at 2540. This completes Level 3B encryption.

Figure 26:
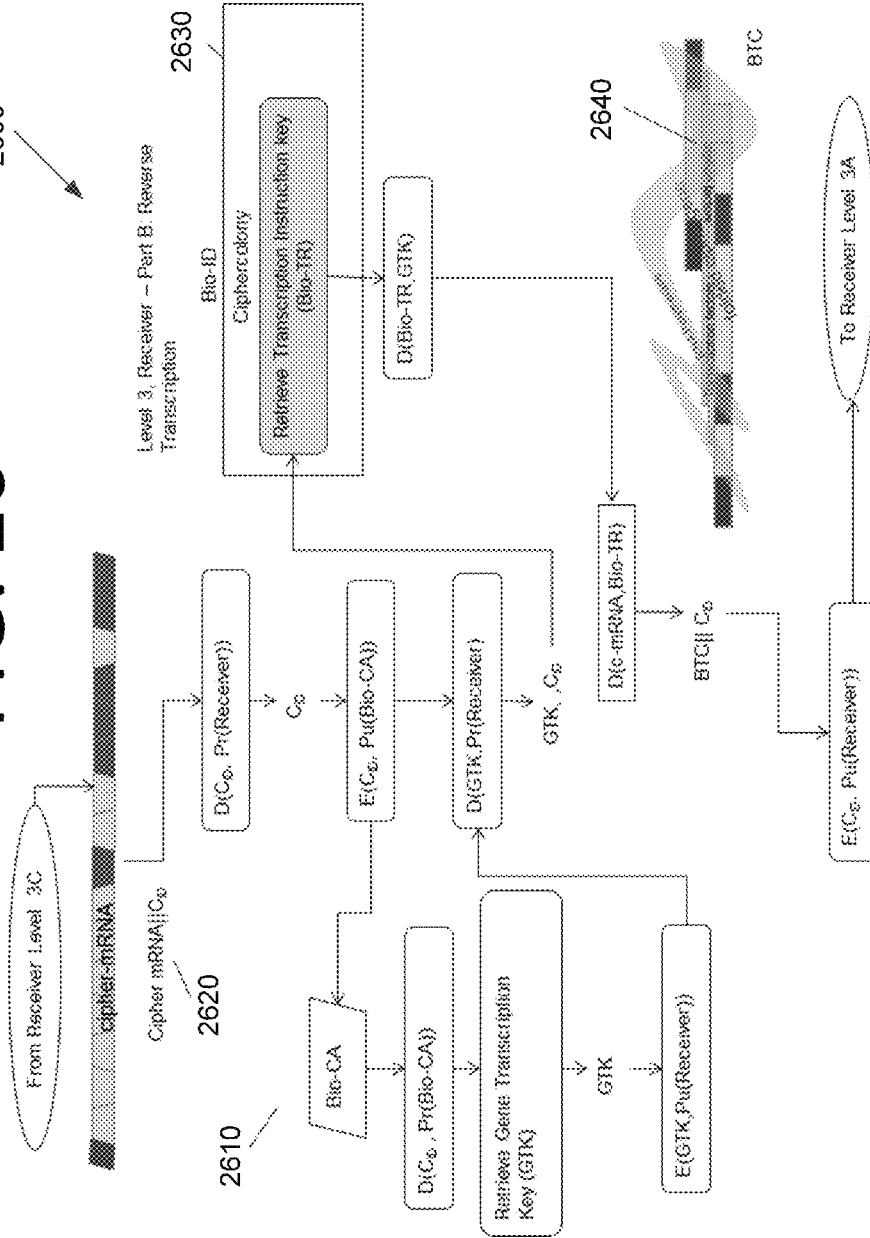
FIG. 26 is a flowchart illustrating Level 3B of the decryption process, according to an embodiment of the present invention.

FIG. 26 describes the process 2600 of decrypting cipher-mRNA‖$C_{ID}$ 2620 to BTC 2640, according to an embodiment of the present invention. The $C_{ID}$ is decrypted with the Receiver private key and encrypted with the Bio-CA public key and sent to remote Bio-CA 2610, decrypted with the Bio-CA private key, and the GTK is retrieved. The GTK is encrypted with the Receiver public key and transmitted to the Receiver. The Receiver decrypts the GTK with its private key and retrieves Bio-TR from the BioID ciphercolony database 2630. Bio-TR is decrypted with the GTK. The cipher-mRNA is decrypted with the Bio-TR and converted to the BTC. The BTC is concatenated with the C and encrypted with the Receiver public key for Level 3A decryption at 2640. This completes Level 3B decryption.

Level 3C Encryption and Decryption

Figure 27:
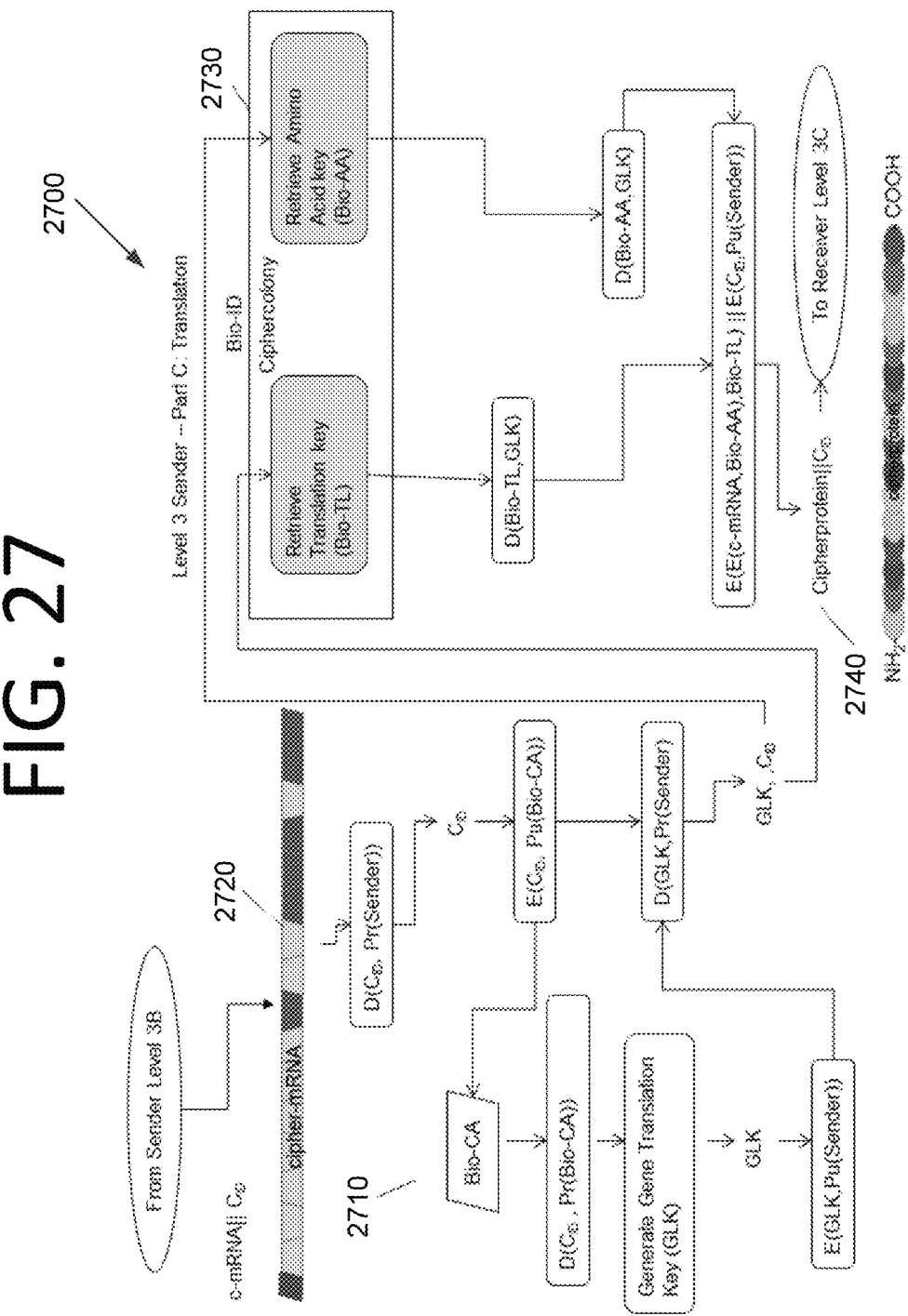
FIG. 27 is a flowchart illustrating Level 3C of the encryption process, according to an embodiment of the present invention.

FIG. 27 describes the process 2700 for coding c-mRNA 2720 into a cipherprotein code 2740, according to an embodiment of the present invention. The Sender decrypts the $C_{ID}$ with its private key. The sender encrypts the $C_{ID}$ with the Bio-CA public key and transmits the encrypted C to a remote Bio-CA 2710. Remote Bio-CA 2710 decrypts the $C_{ID}$ with its private key and retrieves a Gene Translation Key Encryption Key ("GLK") for the message associated with the $C_{ID}$. The Bio-CA encrypts the GLK with the Sender's public key and transmits the encrypted GLK to the Sender. The Sender decrypts the GLK with its private key and retrieves the Translation Key (Bio-TL) and Amino Acid key (Bio-AA) for the translating and editing the c-mRNA from the BioID ciphercolony database 2730. Bio-TL and Bio-AA are decrypted with the GLK. The c-mRNA is encrypted with Bio-AA and Bio-TL, converting it to a cipherprotein code at 2740. The $C_{ID}$ is encrypted with the public key of the sender and concatenated with cipherprotein for transmission to the receiver, who will start the decryption process at Level 3C. This completes Level 3C encryption.

Figure 28:
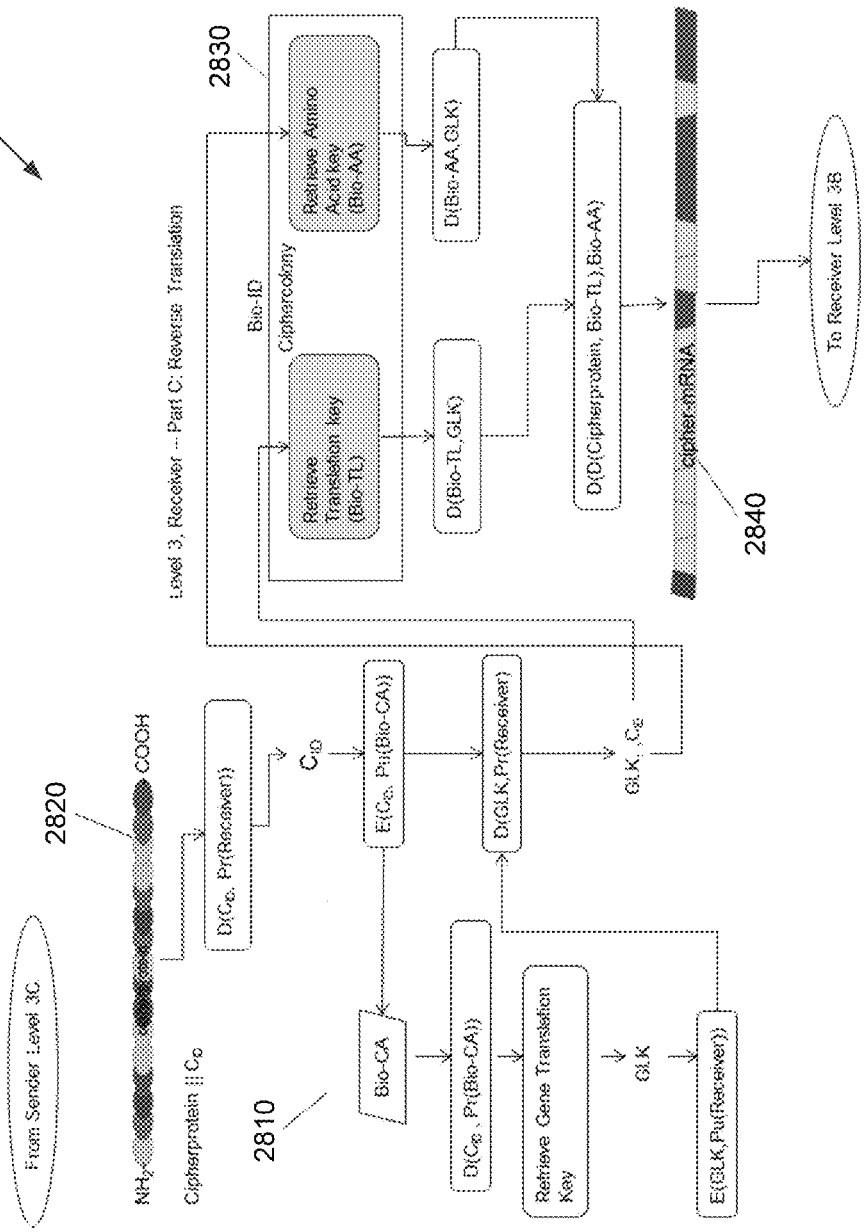
FIG. 28 is a flowchart illustrating Level 3C of the decryption process, according to an embodiment of the present invention.

FIG. 28 describes the process 2800 of decrypting cipherprotein‖$C_{ID}$ 2820 to c-mRNA 2840, according to an embodiment of the present invention. The $C_{ID}$ is decrypted with the Receiver private key, encrypted with the Bio-CA public key, sent to remote Bio-CA 2810, decrypted with the Bio-CA private key, and the GLK is retrieved. The GLK is encrypted with the Receiver public key and transmitted to the Receiver. The Receiver decrypts the GLK with its private key and retrieves Bio-TL and Bio-AA from the BioID ciphercolony database 2830. Bio-TL and Bio-AA are decrypted with the GLK. The cipherprotein is decrypted with the Bio-AA and Bio-TL and converted to the c-mRNA. The c-mRNA is concatenated with the $C_{ID}$ and encrypted with the Receiver public key for Level 3B decryption at 2840. This completes Level 3C decryption.

Additional Features

Figure 29:
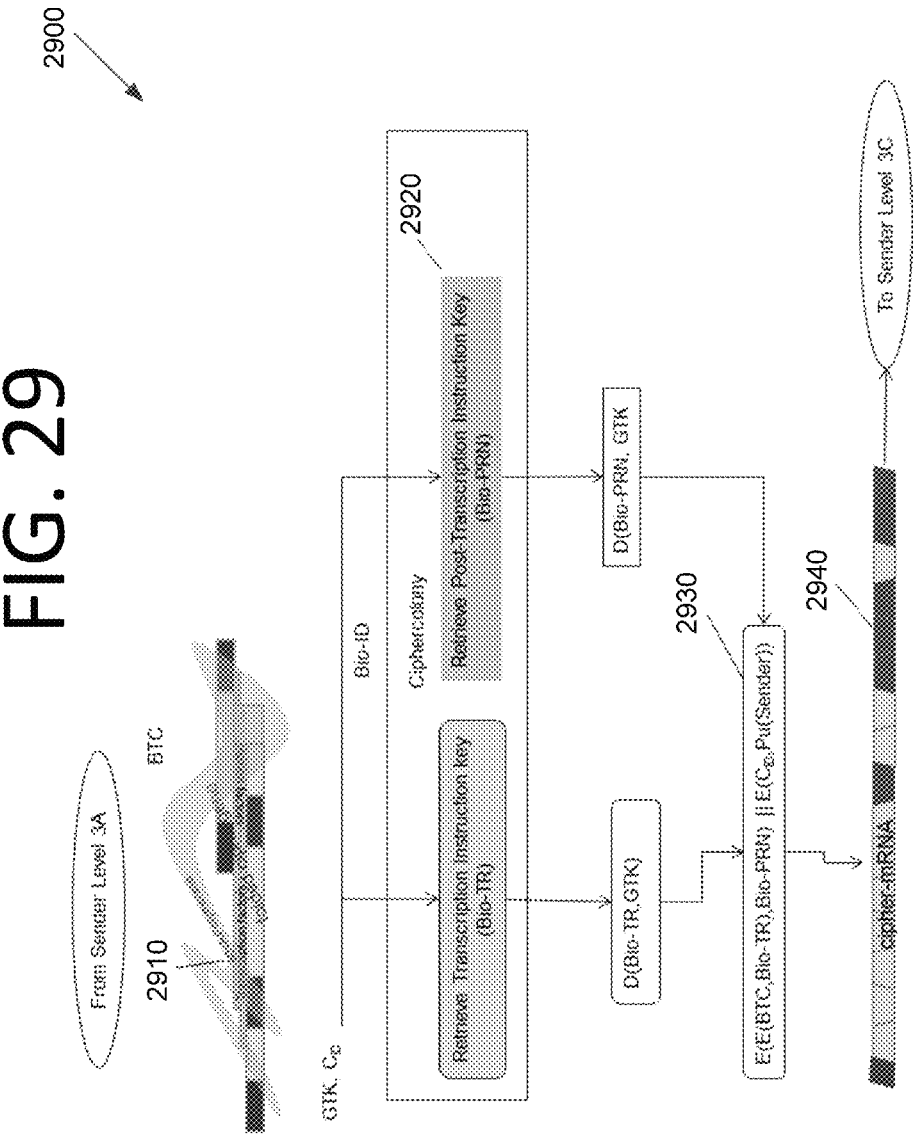
FIG. 29 is a flowchart illustrating post-transcriptional editing encryption, according to an embodiment of the present invention.
Figure 30:
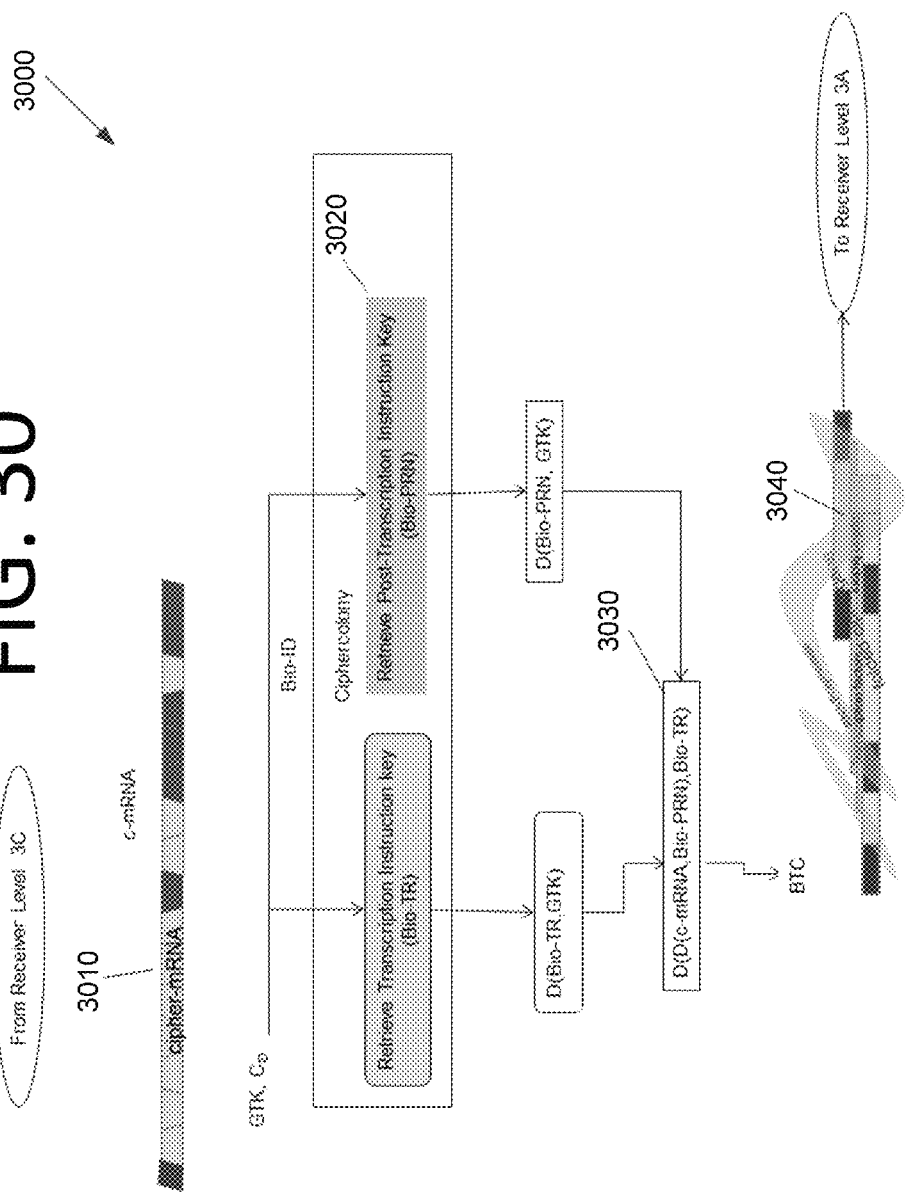
FIG. 30 is a flowchart illustrating post-transcriptional editing decryption, according to an embodiment of the present invention.

FIG. 29 depicts a process 2900 for the Level 3B application of post-transcriptional edits via encryption of the BTC with Bio-PRN post-transcription instruction encryption key, according to an embodiment of the present invention. BTC 2910 is encrypted at 2930 with Bio-TR followed by Bio-PRN 2920 to produce c-mRNA code 2940. FIG. 30 illustrates the reverse process 3000, according to an embodiment of the present invention. In reverse process 3000, c-mRNA 3010 is decrypted at 3030 by Bio-TR followed by Bio-PRN 3020 to produce BTC 3040.

Figure 31:
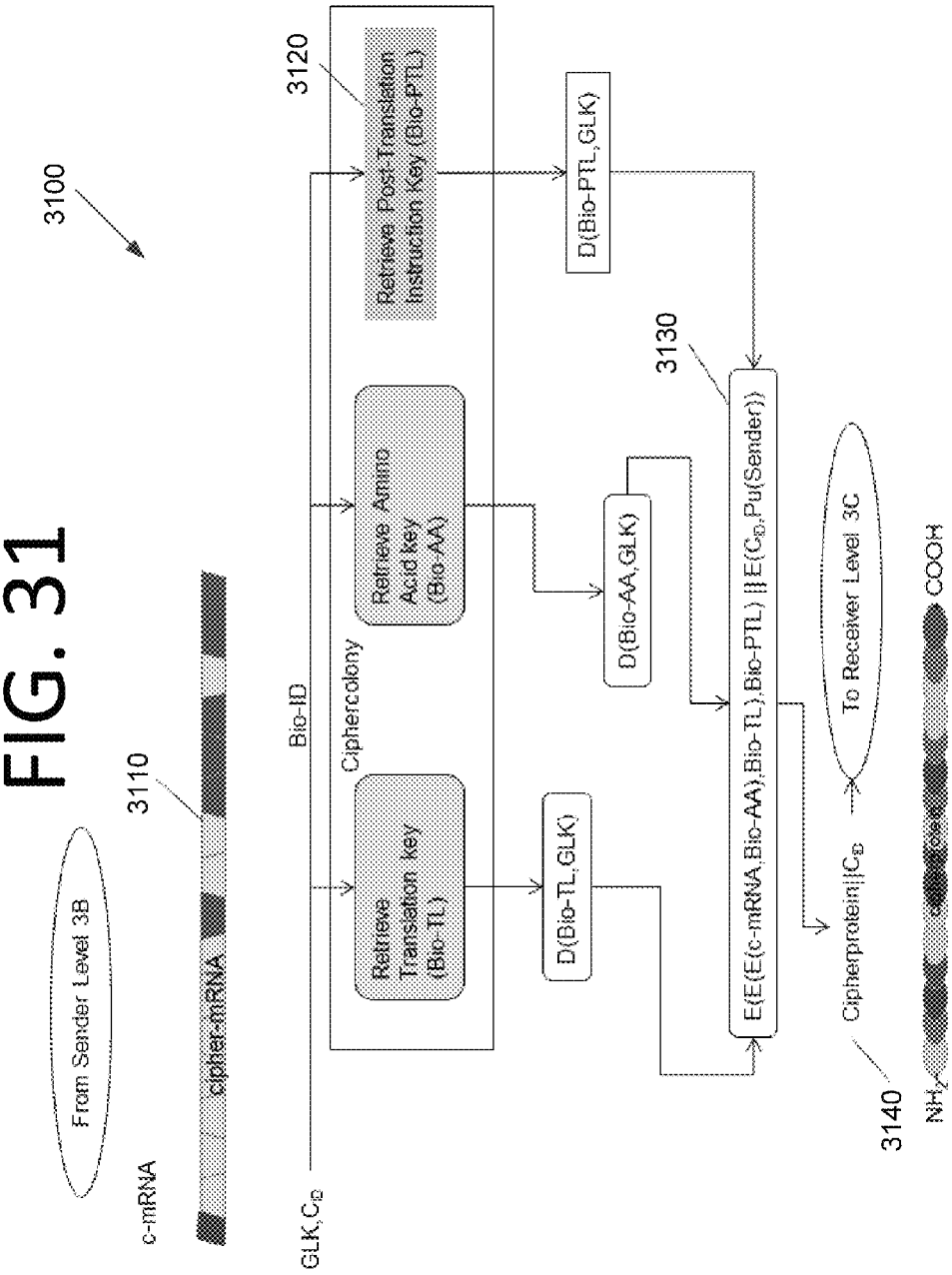
FIG. 31 is a flowchart illustrating post-translational editing encryption, according to an embodiment of the present invention.
Figure 32:
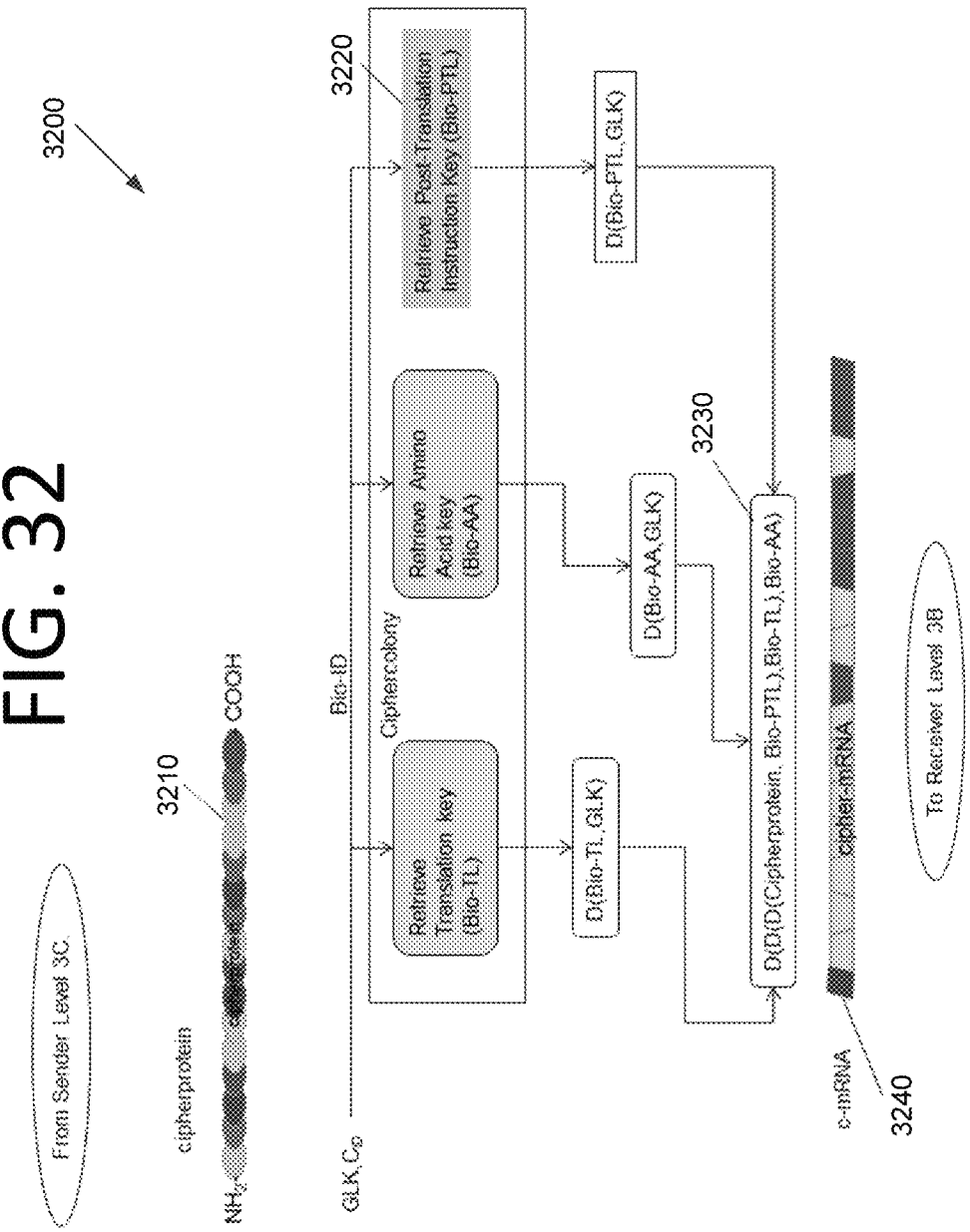
FIG. 32 is a flowchart illustrating post-translational editing decryption, according to an embodiment of the present invention.

FIG. 31 depicts a process 3100 for the Level 3C application of post-translational edits via encryption of the cipher-mRNA with a Bio-PTL post-translation instruction key, according to an embodiment of the present invention. c-mRNA 3110 is encrypted in process 3130 with Bio-AA, followed by Bio-TL, followed by Bio-PTL 3120 to produce cipherprotein code 3140. FIG. 32 depicts the reverse process 3200, according to an embodiment of the present invention. In the reverse process, cipherprotein 3210 is decrypted by Bio-PTL 3220 at 3230 followed by Bio-TL followed by Bio-AA, resulting in c-mRNA at 3240.

Figure 33:
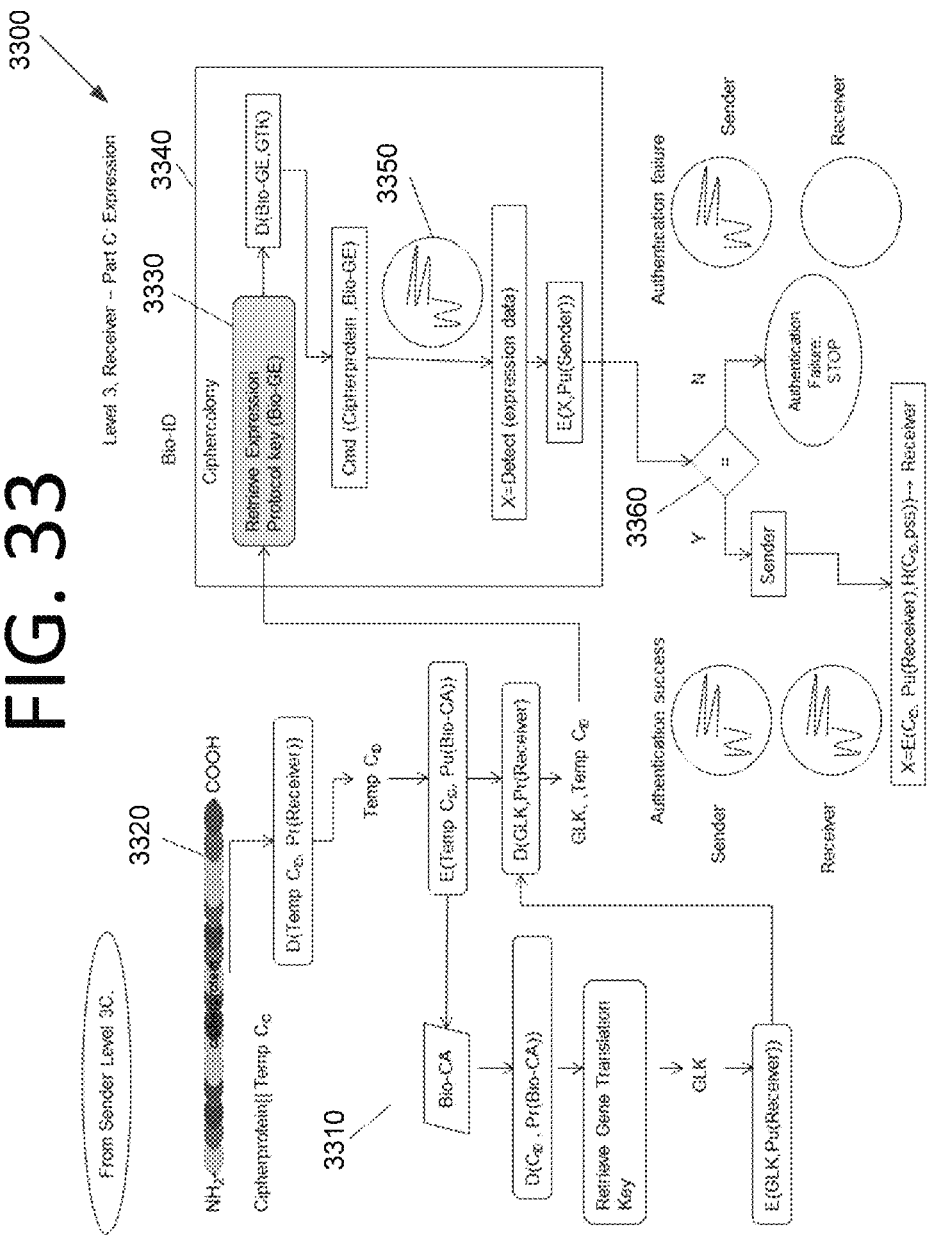
FIG. 33 is a flowchart illustrating authentication through commanded expression of a protein, according to an embodiment of the present invention.

FIG. 33 illustrates an alternative authentication process 3300, according to an embodiment of the present invention. The Sender provides a temporary or provisional $C_{ID}$ to a receiver and a cipherprotein sequence 3320. The Receiver retrieves a GLK at 3310 by the processes previously specified in FIG. 28 and retrieves a Bio-GE key 3330 from the BioID 3340. The Bio-GE key decrypts a gene expression protocol hidden in the cipherprotein sequence code. The BioID executes the gene expression protocol for the cipherprotein and detects the results in 3350. In this example, a fluorescence detection is performed. The detected result is encrypted with the Sender public key and transmitted to the Sender for validation in 3360. If the pattern of expression returned by the Receiver matches the stored pattern at the Sender, the Receiver receives a $C_{ID}$ for a subsequent message or transaction.

Concept of Operation of the Genomic and Proteomic Keys

Keys may be derived from published sources of genomes and proteomes documented in peer-reviewed, scientific literature. The simplest implementation of symmetric encryption and decryption utilizes the XOR function. Given a binary code sequence, designated as A, and a binary key, designated as K, then B=A⊕key for encryption and A=B⊕key for decryption.

Each successive level of encryption performs an XOR operation on the sequence from the previous encryption operation with an encryption key. Each successive level of decryption performs an XOR operation on the sequence from the previous decryption operation with a decryption key. In the most generalized implementation, composite functions are applied to perform the encryption process (of which the simplest to reverse is XOR) and the inverse composite functions are applied for decryption. Some coding cases require a rotation, translation, stretching, or contraction function (e.g., conversion of a ciphergene to a pre-transcriptional complex). This is performed by a conformal mapping in the encrypted direction and inverse conformal mapping in the decrypted direction.

Each key is derived from an m-ary alphabet, where m is the size of the alphabet for the function plus spare codes. For example, the nucleotide alphabet may consist of m=16 letters representing {adenine, thymine, cytosine, guanine, inosine, hypoxanthine, xanthine, uracil, 5-methyl cytosine, and 7 spare codes), the locus control region alphabet could consist of m=32 letters representing {promoter, upstream activator sequence, enhancer, silencer, insulator, start codon, stop codon, TATA box, and 24 spare codes}. The underlying sequences of each function map to a member of the alphabet and a location in the sequence.

The length of binary bit sequence of each letter of the given alphabet is determined by the probability of its occurrence in a sample sequence. The sequence can be from anywhere in the ciphercolony database. The minimum length for a letter in an alphabet is given by:

$$L = \left[\log_2 \frac{1}{p_i}\right]$$

where $p_i$ is the probability of a symbol occurring in a sequence. For example, in a DNA sequence with an alphabet of four letters representing (adenine, guanine, cytosine, thymine) and $p_{(adenine)}=0.23$, $p_{(guanine)}=0.45$, $p_{(cytosine)}=0.17$, and $p_{(thymine)}=0.15$, then:

$$L_{adenine} = \left[\log_2 \frac{1}{0.23}\right] = [2.12] = 3 \text{ bits}$$

Insertion of sequences such as insertion of control sequences can be accomplished by a variety of means. One example is shown in FIG. 34. In 3410, the sequence from a gene in the Bio-DNA database is shown annotated with the control regions, non-coding regions, start and stop codons, exons, and introns. In 3420, a DNA text sequence is shown as a 202 base sequence. In 3430, the DNA text sequence bases replace the protein coding bases in the gene sequence from the Bio-DNA database.

The method steps performed in FIGS. 6-15 and 19-33 may be performed by a computer program product, encoding instructions for the nonlinear adaptive processor to perform at least the methods described in FIGS. 6-15 and 19-33, in accordance with an embodiment of the present invention. The computer program product may be embodied on a computer readable medium. A computer readable medium may be, but is not limited to, a hard disk drive, a flash device, a random access memory, a tape, or any other such medium used to store data. The computer program product may include encoded instructions for controlling the nonlinear adaptive processor to implement the methods described in FIGS. 6-15 and 19-33, which may also be stored on the computer readable medium.

The computer program product can be implemented in hardware, software, or a hybrid implementation. The computer program product can be composed of modules that are in operative communication with one another, and which are designed to pass information or instructions to display. The computer program product can be configured to operate on a general purpose computer, or an application specific integrated circuit ("ASIC").

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. An Internet Protocol Security and Multiprotocol Label Switching network apparatus, comprising:
   a processor and memory storing computer program instructions; and
   a ciphercolony comprising a live side including one or more non-human living organisms and a virtual side storing computer algorithms;
   the ciphercolony also comprising: one or more ciphercolony databases residing in the memory that store a basis of codes to perform authentication and encryption and to provide patterns of gene expression in response to authentication and encryption requests;
   the ciphercolony databases containing instructions for modifying protein codes with post-translational group codes including at least one of Phosphorylation, Giycosylation, Ubiquitination, S-Nitrosylation, Methylation, N-acetylation, Lipidation, and Proteolysis;
   the protein codes are modified with a BioID, to accept a plaintext message and synthesize a protein corresponding to the cipherprotein sequence generated from the plaintext-message with the BioID identifying one or more proteins in the live flora/fauna of the ciphercolony and generate one or more plaintext messages corresponding to the code associated with the decrypted cipherprotein sequence.

* * * * *